(12) United States Patent
Horiuchi et al.

(10) Patent No.: US 8,743,769 B2
(45) Date of Patent: Jun. 3, 2014

(54) RADIO COMMUNICATION DEVICE AND RADIO COMMUNICATION SYSTEM

(75) Inventors: Ayako Horiuchi, Kanagawa (JP); Seigo Nakao, Kanagawa (JP); Kenichi Miyoshi, Kanagawa (JP); Katsuhiko Hiramatsu, Kanagawa (JP); Hiroaki Morino, Tokyo (JP)

(73) Assignee: Panasonic Corporation, Kadoma-Shi (JP)

( * ) Notice: Subject to any disclaimer, the term of this patent is extended or adjusted under 35 U.S.C. 154(b) by 825 days.

(21) Appl. No.: 12/993,595

(22) PCT Filed: May 13, 2009

(86) PCT No.: PCT/JP2009/002096
§ 371 (c)(1),
(2), (4) Date: Mar. 4, 2011

(87) PCT Pub. No.: WO2009/141975
PCT Pub. Date: Nov. 26, 2009

(65) Prior Publication Data
US 2011/0170425 A1    Jul. 14, 2011

(30) Foreign Application Priority Data

May 21, 2008    (JP) ............................. P2008-133177

(51) Int. Cl.
*H04B 7/14*    (2006.01)
(52) U.S. Cl.
USPC ........... 370/315; 370/241; 370/252; 370/310; 455/11.1; 455/13.1; 455/16; 455/17
(58) Field of Classification Search
USPC ........ 370/241, 252, 310, 315; 455/11.1, 13.1, 455/16, 17
See application file for complete search history.

(56) References Cited

U.S. PATENT DOCUMENTS 7,075,913 B1 *   7/2006   Yavuz et al. ................... 370/335
7,940,728 B2 *   5/2011   Horiuchi et al. .............. 370/335
(Continued)

FOREIGN PATENT DOCUMENTS

EP       1734705 A      12/2006
JP       2004-015136 A   1/2004
(Continued)

OTHER PUBLICATIONS

Nakajima, Akinori, et al., Throughout performance of DS-CDMA MIMO multiplexing with frequency-domain iterative PIC; Department of Electrical and Communication Engineering, Graduate School of Engineering, Tohoku University Jun. 6, 2005 Aza-Aoba, Aramaki, Aoba-ku, Sendai, 980-8579 Japan.

*Primary Examiner* — Charles C Jiang
*Assistant Examiner* — Siming Liu
(74) *Attorney, Agent, or Firm* — Pearne & Gordon LLP

(57) ABSTRACT

Disclosed is a radio communication device capable of improving the usage efficiency of resources in multi-stage relay to reduce the amount of delay of a relay signal and improving the reception quality of signals by a relay station or a base station. A transmission determining unit 16 determines whether to transmit the relay signal and whether to transmit ACK/NACK on the basis of whether there is an error in the relay signal, and on the basis of ACK/NACK received from a one-hop-downstream radio communication device. An MCS determining unit 17 provided in the transmission determining unit 16 determines an MCS for the relay signal. A transmission instruction generated by the transmission determining unit 16 is output to a buffer 11 and an ACK/NACK generating unit 19. The determined MCS is output to an error correction coding unit 12 and a modulation unit 13. The ACK/NACK generating unit 19 generates ACK when there is no error in the relay signal, and generates NACK when there is an error in the relay signal.

8 Claims, 30 Drawing Sheets

(56) References Cited

U.S. PATENT DOCUMENTS

| | | |
|---|---|---|
| 2006/0159054 A1 | 7/2006 | Kobayashi et al. |
| 2006/0285505 A1 | 12/2006 | Cho et al. |
| 2007/0099652 A1* | 5/2007 | Lindoff et al. ............ 455/552.1 |
| 2009/0227201 A1 | 9/2009 | Imai et al. |
| 2009/0239542 A1 | 9/2009 | Horiuchi et al. |
| 2010/0128622 A1 | 5/2010 | Horiuchi et al. |
| 2010/0157874 A1 | 6/2010 | Lin et al. |
| 2011/0110284 A1 | 5/2011 | Wu et al. |

FOREIGN PATENT DOCUMENTS

| | | |
|---|---|---|
| JP | 2006-180136 A | 7/2006 |
| WO | 2006-098273 A1 | 9/2006 |
| WO | 2006/106766 A1 | 10/2006 |
| WO | WO 2006106766 A1 * | 10/2006 |
| WO | 2007-000742 A2 | 1/2007 |
| WO | 2008/142837 A1 | 11/2008 |
| WO | 2009/057183 A1 | 5/2009 |
| WO | 2009/081513 A1 | 7/2009 |

* cited by examiner

SYSTEM
PRIOR ART

OPERATION EXAMPLE

OPERATION
EXAMPLE
(Pattern 1)

OPERATION EXAMPLE
(Pattern 3)

OPERATION
EXAMPLE
(Pattern 4)

BLOCK DIAGRAM OF RELAY STATION DEVICE
(EMBODIMENT 1)

FLOWCHART OF TRANSMISSION DETERMINING UNIT
(EMBODIMENT 1)

FLOWCHART OF MOBILE STATION DEVICE
(EMBODIMENT 1)

OPERATION EXAMPLE (EMBODIMENT 2)

FLOWCHART OF TRANSMISSION DETERMINING UNIT
(EMBODIMENT 2)

FLOWCHART OF TRANSMISSION DETERMINING UNIT IN MOBILE STATION
(EMBODIMENT 2)

OPERATION
EXAMPLE
(Pattern 1)

OPERATION
EXAMPLE
(Pattern 2)

OPERATION
EXAMPLE
(Pattern 3)

OPERATION
EXAMPLE
(Pattern 4)

OPERATION
EXAMPLE

RADIO COMMUNICATION DEVICE AND RADIO COMMUNICATION SYSTEM

TECHNICAL FIELD

The present invention relates to a radio communication device and a radio communication system that performs multi-stage relay from a source radio communication device, to a destination radio communication device.

BACKGROUND ART

In recent years, in cellular mobile communication systems, with the combination of various kinds of information into multimedia, a large amount of data, such as voice data, still image data, and moving image data, is generally transmitted. A technique for achieving a high transmission rate using a high-frequency radio band has been actively studied in order to transmit a large amount of data.

When the high-frequency radio band is used, it is possible to expect a high transmission rate in a short distance. However, as the distance increases, attenuation due to a transmission distance increases. When a mobile communication system using the high-frequency radio band is operated in practice, the coverage of a radio communication base station device (hereinafter, simply referred to as a base station) is reduced. Therefore, it is necessary to set a large number of base stations. Since the setting cost of the base stations is great, there is a strong demand for a technique capable of providing a communication service using the high-frequency radio band while preventing an increase in the number of base stations.

For the demand, in order to expand the coverage of each base station, a relay transmission technique has been studied which sets radio communication relay station devices (hereinafter, simply referred to as relay stations) between a base station and a radio communication mobile station device (hereinafter, simply referred to as a mobile station) in multiple stages and performs communication between the base station and the mobile station through the relay stations, as shown in FIG. 1. When the relay transmission technique is used, the mobile station that is incapable of directly communicating with the base station can communicate with the base station through the relay stations.

However, in the multi-stage relay shown in FIG. 1, when the number of hops from a transmission source to a reception destination (the number of relay stages between the transmission source and the reception destination) increases, the amount of delay increases. Therefore, it is necessary to reduce the amount of delay. As a method of reducing the amount of delay, a method has been proposed which improves the reception quality of signals by each relay station to reduce the number of retransmissions (see Non-patent Literature 1).

Non-patent Literature 1 discloses a technique in which each relay station receives signals transmitted to other relay stations, stores the received signals in a buffer, and combines the signals at the maximum ratio, thereby improving the reception quality of signals by each relay station.

The relay method disclosed in Non-patent Literature 1 will be described using the arrangement of the relay stations shown in FIG. 1 as an example. A relay station 1, a relay station 2, a relay station 3, a relay station 4, and a base station 6 receive the signal transmitted from a mobile station 5. The relay stations 1 to 4 and the base station 6 store the received signals in the buffers. The relay station 2 combines the signal to be subsequently relayed from the relay station 1 with the signal that has been transmitted from the mobile station 5 and then stored in the buffer at the maximum ratio.

In this way, it is possible to improve the reception quality of the signal obtained by combining the signal from the mobile station 5 and the signal from the relay station 1 at the maximum ratio, as compared to reception quality when only the signal transmitted from the relay station 1 is received. Since the relay station 3 combines the signal from the mobile station 5, the signal from the relay station 1, and the signal from the relay station 2 at the maximum ratio, it is possible to further improve reception quality. As such, according to the method disclosed in Non-patent Literature 1, it is possible to improve the reception quality of signals by each relay station to reduce the number of retransmissions, thereby reducing the amount of delay.

CITATION LIST

Non-Patent Literature

Non-Patent Literature 1: Transmission Power Efficiency of Multi-Hop MRC Diversity for DS-CDMA Virtual Cellular Network (Technical Report of IEICE, RCS, Radio communication system Vol. 104, No. 597 (20050119), pp. 19-24, RCS2004-239)

SUMMARY OF INVENTION

Technical Problem

However, in Non-patent Literature 1, a plurality of relay stations is in a reception state all the time. Therefore, the usage efficiency of resources is reduced. For example, when the signal transmitted from the mobile station 5 to the relay station 1 is greatly attenuated before it reaches the base station 6, it is possible to use the same resource from the relay station 4 to the base station 6 in order to relay signals. However, it is difficult to use the same resource in the method disclosed in Non-patent Literature 1.

In the method disclosed in Non-patent Literature 1, even when the relay station 3 succeeds in receiving the signal from the mobile station 5 at the time when it receives the signal from the relay station 1, the relay station 3 needs to wait for the reception of the signal from the relay station 2, which reduces the usage efficiency of resources.

An object of the invention is to provide a radio communication device and a radio communication system capable of improving the usage efficiency of resources in multi-stage relay from a source radio communication device, to a destination radio communication device, to reduce the amount of delay of a relay signal and improving the reception quality of signals by a radio communication device, which is a reception destination.

Solution to Problem

In the specification, a transmission source side is represented by the "upstream side" and a destination (transmission destination) side is represented by the "downstream side". That is, a transmission source is referred to as the "upstream side", as viewed from the destination, and a destination is referred to as the "downstream side", as viewed from the transmission source.

In the invention, when the relay station that succeeds in receiving a signal from a mobile station (source radio communication device) or a relay station (radio communication device) that is one hop upstream therefrom receives ACK from a relay station that is one hop downstream, it sets the same MCS (Modulation and Coding Scheme) used by the relay station that is one hop downstream to transmit signals and transmits the signal using the set MCS. When the relay station that succeeds in receiving a signal from the mobile station or the relay station that is one hop upstream therefrom receives NACK from the relay station that is one hop downstream, it sets an MCS used by the relay station to transmit signals and transmits the signal using the set MCS. In this way, the relay stations performing multi-stage relay can perform cooperative relay with the same MCS.

When receiving a signal from the mobile station or the relay station that is one hop upstream, the relay station does not transmit ACK/NACK. When receiving a signal from the mobile station or the relay station that is two hops upstream, the relay station transmits ACK/NACK. In this way, the relay station that is one hop downstream from the transmission source does not transmit ACK/NACK. Therefore, when the relay station that is two hops downstream receives a signal (OK), it is possible to prevent the relay station that is one hop downstream from transmitting a retransmission request to the transmission source.

The relay station that fails in receiving a signal from the mobile station or the relay station that is one hop upstream therefrom transmits NACK to the mobile station or the relay station that is one hop upstream when receiving NACK from the relay station that is one hop downstream. In this way, when both the relay station that is one hop downstream from the transmission source and the relay station that is two hops downstream from the transmission source fail in receiving signals, the transmission source can retransmit the signals.

The relay station follows the above-mentioned rule only when receiving control information indicating that a signal is relayed to the relay station that is two hops downstream. The above-mentioned operation may be performed on all routes or some of the routes. In this way, when the distance between two hops is too long to transmit signals, it is possible to transmit signals with one-hop transmission.

A relay station sets the same MCS used by the relay station that is one hop downstream to transmit signals and transmits signals with the set MCS when receiving NACK from the relay station that is two hops downstream. In this way, when the relay station receiving NACK from the relay station that is two hops downstream therefrom, it predicts the retransmission of signals by the relay station that is one hop downstream, sets an MCS for cooperative relay with the relay station that is one hop downstream, and transmits signals with the set MCS. Therefore, it is possible to improve the reception quality of signals by the relay station that is two hops downstream.

A radio communication device according to the present invention is a radio communication device that relays between a source radio communication device, and a destination radio communication device, in multiple stages, comprising: a reception unit that receives a signal; an MCS setting unit that sets the same MCS used by a one-hop-downstream radio communication device for transmitting a relay signal when succeeding in receiving a relay signal from a one-hop-upstream radio communication device and receiving ACK from the one-hop-downstream radio communication device; an encoding/modulation unit that encodes and modulates the relay signal with the MCS set by the MCS setting unit; and a transmission unit that transmits the relay signal encoded and modulated by the encoding/modulation unit.

According to the configuration, in the multi-stage relay, when a radio communication device receives ACK from the one-hop-downstream radio communication device therefrom, the cooperative relay between the radio communication device and the one-hop-downstream radio communication device is performed. Therefore, it is possible to improve the reception quality of signals by a reception destination. In addition, it is possible to improve the usage efficiency of resources in the multi-stage relay and reduce the amount of delay of the relay signal.

The radio communication device according to the present invention is configured in that the MCS setting unit sets an MCS used by the radio communication device including the MCS setting unit for transmitting the relay signal when receiving NACK from the one-hop-downstream radio communication device.

According to the configuration, in the multi-stage relay, the radio communication device retransmits the relay signal when receiving NACK from the one-hop-downstream radio communication device therefrom. Therefore, it is possible to relay signals to the one-hop-downstream radio communication device during retransmission.

The radio communication device according to the present invention is configured in that the MCS setting unit sets the same MCS used by the one-hop-downstream radio communication device for transmitting the relay signal only when receiving control information for relaying the relay signal to a two-hops-downstream radio communication device.

According to the configuration, the MCS is set according to the control information. Therefore, when the distance between two hops is too long to transmit signals, it is possible to change the transmission method to one-hop transmission. In this case, the above-mentioned operation may be performed on all routes or some of the routes.

The radio communication device according to the present invention is configured in that the MCS setting unit sets the same MCS used by the one-hop-downstream radio communication device for transmitting the relay signal when receiving NACK from a two-hops-downstream radio communication device.

According to the configuration, the radio communication device sets the MCS used by the one-hop-downstream radio communication device therefrom to transmit signals when receiving NACK from the two-hops-downstream radio communication device therefrom. Therefore, the cooperative relay between the radio communication device and the one-hop-downstream radio communication device is performed. As a result, it is possible to improve the reception quality of signals by the two-hops-downstream radio communication device.

The radio communication device according to the present invention is configured by comprising: a transmission determining unit that determines whether to transmit the relay signal on the basis of whether there is an error in the received relay signal and ACK/NACK received from the one-hop-downstream radio communication device, wherein the transmission determining unit determines not to transmit the ACK/NACK when receiving the relay signal from the one-hop-upstream radio communication device and determines to transmit the ACK/NACK when receiving the relay signal from a two-hops-upstream radio communication device.

According to the configuration, it is possible to prevent the radio communication device to transmit a retransmission request to the one-hop-upstream radio communication device therefrom when receiving the relay signal from the two-hops-upstream radio communication device therefrom.

The radio communication device according to the present invention is configured by comprising: a transmission determining unit that determines whether to transmit the relay signal on the basis of whether there is an error in the received relay signal and ACK/NACK received from the one-hop-downstream radio communication device, wherein the transmission determining unit determines to transmit NACK to the one-hop-upstream radio communication device when failing in receiving the relay signal from the one-hop-upstream radio communication device and receiving the NACK from the one-hop-downstream radio communication device.

According to the configuration, the radio communication device transmits NACK to the one-hop-upstream radio communication device therefrom when failing in receiving the relay signal from the one-hop-upstream radio communication device and receiving NACK from the one-hop-downstream radio communication device. Therefore, when both the radio communication device and the one-hop-downstream radio communication device fail in receiving the relay signal, it is possible to request the transmission source to retransmit the relay signal.

A radio communication device according to the present invention is a radio communication device that relays between a source radio communication device, and a destination radio communication device, in multiple stages, comprising: a reception unit that receives a signal; an MCS setting unit that sets the same MCS used by a one-hop-upstream radio communication device for transmitting a relay signal when succeeding in receiving a relay signal from a two-hops-upstream radio communication device and receiving ACK from the one-hop-upstream radio communication device; an encoding/modulation unit that encodes and modulates the relay signal with the MCS set by the MCS setting unit; and a transmission unit that transmits the relay signal encoded and modulated by the encoding/modulation unit.

According to the configuration, in the multi-stage relay, the radio communication device performs cooperative relay with the one-hop-upstream radio communication device therefrom when receiving ACK from the one-hop-upstream radio communication device. Therefore, it is possible to improve the reception quality of signals by a reception destination. In addition, it is possible to improve the usage efficiency of resources in the multi-stage relay and reduce the amount of delay of the relay signal.

A radio communication device according to the present invention is a radio communication device that relays between a source radio communication device, and a destination radio communication device, in multiple stages, comprising: a reception unit that receives a signal; an MCS setting unit that sets the same MCS set when a relay signal is transmitted from a one-hop-upstream radio communication device, when succeeding in receiving the relay signal from the one-hop-upstream radio communication device and receiving a signal indicating a high SNR from a one-hop-downstream radio communication device; an encoding/modulation unit that encodes and modulates the relay signal with the MCS set by the MCS setting unit; and a transmission unit that transmits the relay signal encoded and modulated by the encoding/modulation unit.

According to the configuration, even when the one-hop-downstream radio communication device fails in receiving a signal, the radio communication device performs cooperative relay with the one-hop-downstream radio communication device when the SNR is high. Therefore, it is possible to improve the reception quality of signals by a reception destination.

The radio communication device according to the present invention is configured in that the MCS setting unit sets an MCS used by the radio communication device including the MCS setting unit for transmitting the relay signal when receiving a signal indicating a low SNR from the one-hop-downstream radio communication device.

According to the configuration, in the multi-stage relay, when the radio communication device receives a signal indicating a low SNR from the one-hop-downstream radio communication device therefrom, it retransmits the relay signal. Therefore, it is possible to relay the relay signal to the one-hop-downstream radio communication device during retransmission.

A radio communication system according to the present invention is configured by comprising: a first radio communication device and a second radio communication device that are configured to relay communication between a source radio communication device and a destination radio communication device in multiple stages, wherein the source radio communication device transmits a relay signal to the second radio communication device, when succeeding in receiving the relay signal transmitted from the source radio communication device to the second radio communication device and receiving ACK from the second radio communication device, the first radio communication device transmits the relay signal to the destination radio communication device with the same MCS used by the second radio communication device to transmit the relay signal, thereby performing cooperative relay with the second radio communication device, when succeeding in receiving the relay signal transmitted from the source radio communication device, the second radio communication device transmits ACK to the first radio communication device and transmit the relay signal to the destination radio communication device with an MCS used by the second radio communication device for transmitting the relay signal, thereby performing cooperative relay with the first radio communication device, and the destination radio communication device receives the relay signal that is cooperatively relayed by the first radio communication device and the second radio communication device with the same MCS.

According to the configuration, in the multi-stage relay, when receiving ACK from the radio communication device or the destination one-hop-downstream radio communication device, the radio communication device performs cooperative relay with the radio communication device or the destination one-hop-downstream radio communication device. Therefore, it is possible to improve the reception quality of signals by a reception destination. In addition, it is possible to improve the usage efficiency of resources in the multi-stage relay and reduce the amount of delay of the relay signal.

Advantageous Effects of Invention

According to the invention, it is possible to improve the usage efficiency of resources in the multi-stage relay and reduce the amount of delay of the relay signal. In addition, in the multi-stage relay, a radio communication device that transmits a relay signal and a one-hop-upstream radio communication device therefrom perform cooperative relay with the same MCS. Therefore, it is possible to improve the reception quality of signals by a relay destination.

DESCRIPTION OF EMBODIMENTS

Figure 1:
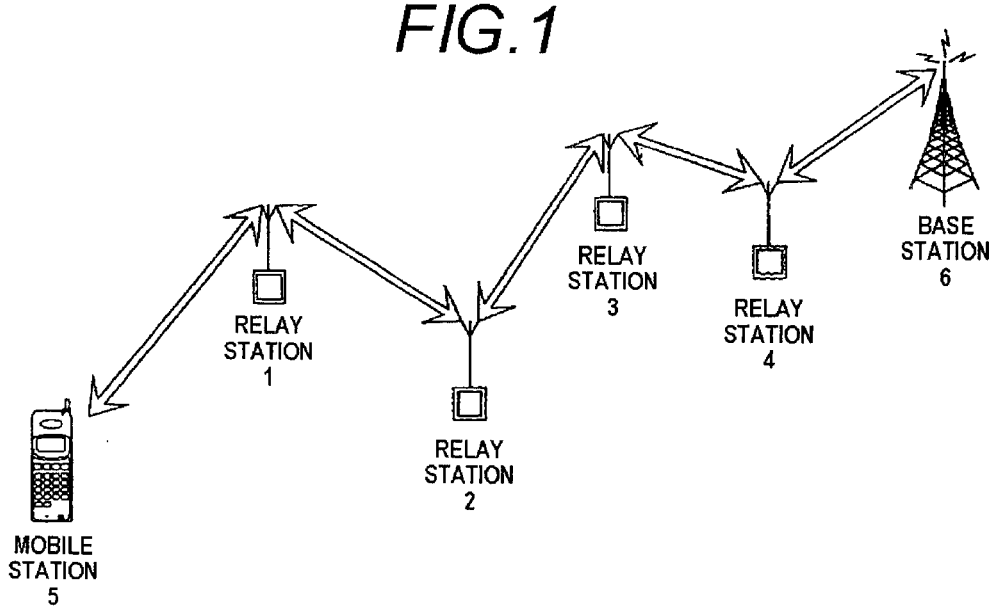
FIG. 1 illustrates a multi-stage relay system.
Figure 2:
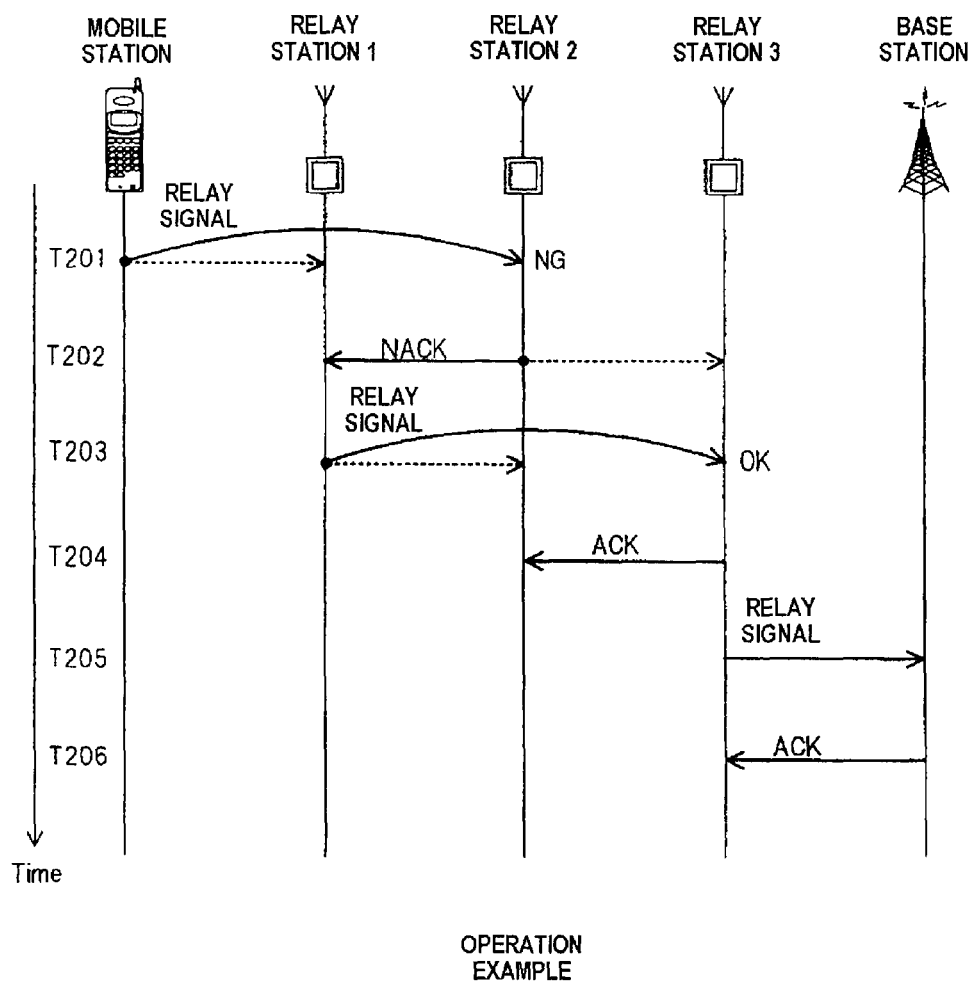
FIG. 2 illustrates an operation example of the multi-stage relay system.

First, a multi-stage relay communication system, which is the base of each embodiment of the present invention, that performs multi-stage relay between a source radio communication device, and a radio communication device, which is a transmission destination, will be described. An operation example of the multi-stage relay communication system is shown in FIG. 2. In this example, a mobile station is a transmission source and a base station is a final destination. A relay station 1, a relay station 2, a relay station 3 are arranged between the mobile station and the base station. The mobile station, the relay station 1, the relay station 2, the relay station 3, and the base station are arranged in this order.

First, the mobile station, which is a transmission source, transmits a relay signal to the relay station 2 that is two hops downstream from the mobile station (T201). In this case, the relay station 1 that is one hop downstream from the mobile station also receives the relay signal (T201). When succeeding in receiving the relay signal, the relay station 2 transmits ACK to the relay station 1 that is one hop upstream therefrom, and when failing in receiving the relay signal, the relay station 2 transmits NACK to the relay station 1 (T202). In this example, since the relay station 2 fails in receiving the relay signal, the relay station 2 transmits NACK to the relay station 1 (T202).

When receiving NACK from the relay station 2, the relay station 1 transmits the relay signal (T203). Since the final destination is the base station, the relay station 1 transmits the relay signal to the relay station 3 that is two hops downstream therefrom (T203). In this case, the relay station 2 also receives the relay signal (T203).

Then, similarly, when succeeding in receiving the relay signal, the relay station 3 transmits ACK to the relay station 2 that is one hop upstream therefrom, and when failing in receiving the relay signal, the relay station 3 transmits NACK to the relay station 2 (T204). In this example, since the relay station 3 succeeds in receiving the relay signal, the relay station 3 transmits ACK to the relay station 2 (T204).

Since the relay station 3 succeeds in receiving the relay signal, the relay station 3 transmits the relay signal to the base station, which is the final destination (T205). When succeeding in receiving the relay signal, the base station transmits ACK to the relay station 3 that is one hop upstream therefrom, and when failing in receiving the relay signal, the base station transmits NACK to the relay station 3 (T206). In this example, since the base station succeeds in receiving the relay signal, the base station transmits ACK to the relay station 3 (T206) and ends the communication.

In this case, when the reception of the relay signal succeeds, it is possible to relay signals to the relay station that is two hops downstream. Therefore, it is possible to reduce the amount of delay, as compared to the structure in which signals are relayed one hop by one hop in multiple stages. In addition, when the relay station that is one hop downstream succeeds in receiving the relay signal, the relay station that is one hop upstream can retransmit the relay signal during retransmission. Therefore, even when a signal is retransmitted, it is possible to transmit the relay signal to the relay station that is one hop downstream. As a result, it is possible to reduce the amount of delay.

In each embodiment of the invention, it is assumed that each relay station stores routing information and the information of the relay station that is at least two hops downstream. In addition, it is assumed that an MCS used by the relay station to transmit a signal to another relay station that is two hops downstream therefrom is transmitted to the relay station that is one hop downstream. The routing information and the MCS may be transmitted periodically or only when they are changed.

Embodiment 1

In this embodiment, in the multi-stage relay system described with reference to FIG. 2, the relay station that transmits the relay signal and another relay station that is one hop upstream from the relay station perform cooperative relay with the same MCS. In this way, as described above, when the reception of the relay signal succeeds, it is possible to perform multi-stage relay between the relay stations that are two hops away from each other. Therefore, it is possible to reduce the amount of delay. In addition, since the relay station and another relay station that is one hop upstream therefrom perform cooperative relay, it is possible to obtain a diversity effect and improve reception quality. The cooperative relay is also called collaborative relay.

Specifically, in the this embodiment, a relay method varies depending on whether the relay station that is one hop downstream from the transmission source or the relay station that is two hops downstream from the transmission source succeeds in receiving the signal transmitted from the transmission source. The relay methods from the mobile station to the relay station are classified into four patterns, which are shown in the following Table 1. Each of the patterns will be described using the same operation diagram as that shown in FIG. 2.

TABLE 1

| | Transmission pattern | |
|---|---|---|
| Relay station that is one hop downstream (relay station 1) | Relay station that is two hops downstream (relay station 2) | |
| Pattern 1 OK | OK | Relay station 1 and relay station 2 perform cooperative relay with MCS of relay station 2 |
| Pattern 2 OK | NG | Relay station 1 transmits signals |
| Pattern 3 NG | OK | Relay station 2 transmits signals |

TABLE 1-continued

| | Transmission pattern | |
|---|---|---|
| Relay station that is one hop downstream (relay station 1) | Relay station that is two hops downstream (relay station 2) | |
| Pattern 4 NG | NG | Relay station 1 transmits retransmission request to mobile station |

(Pattern 1)

Figure 3:
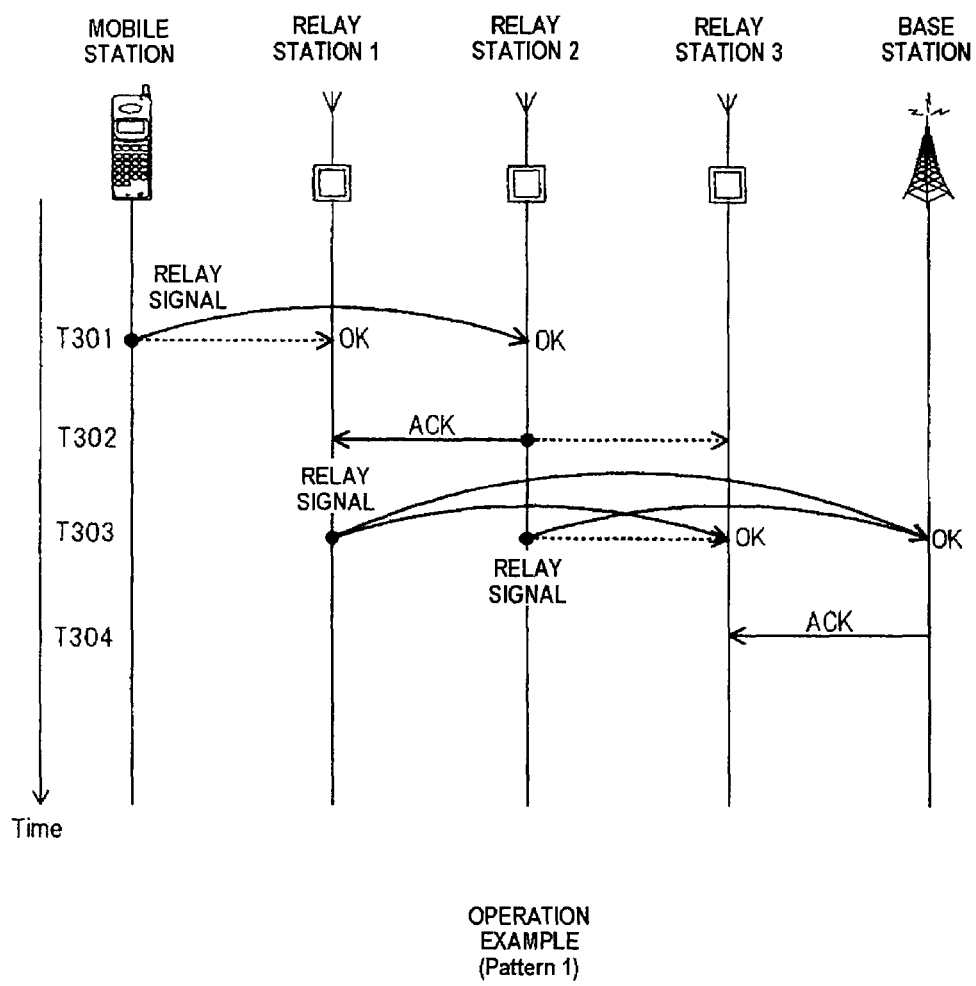
FIG. 3 illustrates an operation example (pattern 1) of a radio communication method according to a first embodiment of the invention.

FIG. 3 shows an operation example (pattern 1). Pattern 1 is a case in which, when the mobile station transmits a signal, both the relay station 1 and the relay station 2 succeed in receiving the signal (T301). Since the relay station 2 succeeds in receiving the signal, the relay station 2 transmits ACK to the relay station 1 that is one hop upstream therefrom (T302). When receiving ACK from the relay station 2 (T302), the relay station 1 determines that the relay station 2 can relay the signal.

The relay station 1 transmits the relay signal with the same MCS used by the relay station 2 to relay signals to the base station that is two hops downstream therefrom and at the same transmission timing as the relay station 2 relays signals to the base station (T303). The relay station 3 also receives ACK from the relay station 2 (T302). The base station receives the signal from the relay station 1 and the signal from the relay station 2 at the same time (T303). Therefore, it is possible to obtain a transmission diversity effect.

When receiving ACK from the relay station 2 (T302), the relay station 3 determines that the destination of the relay signal transmitted by the relay station 2 is the base station. Therefore, the relay station 3 receives the relay signal transmitted from the relay station 2 (T303), but does not transmit ACK/NACK. When succeeding in receiving the relay signal (T303: OK), the base station transmits ACK to the relay station 3 that is one hop upstream therefrom (T304). When receiving ACK from the base station, which is the final destination, the relay station 3 does not transmit the relay signal.

As such, in the pattern 1, it is possible to improve the reception quality of signals by the relay station 3, and the base station by the transmission diversity effect of the relay station 1 and the relay station 2.

(Pattern 2)

Figure 4:
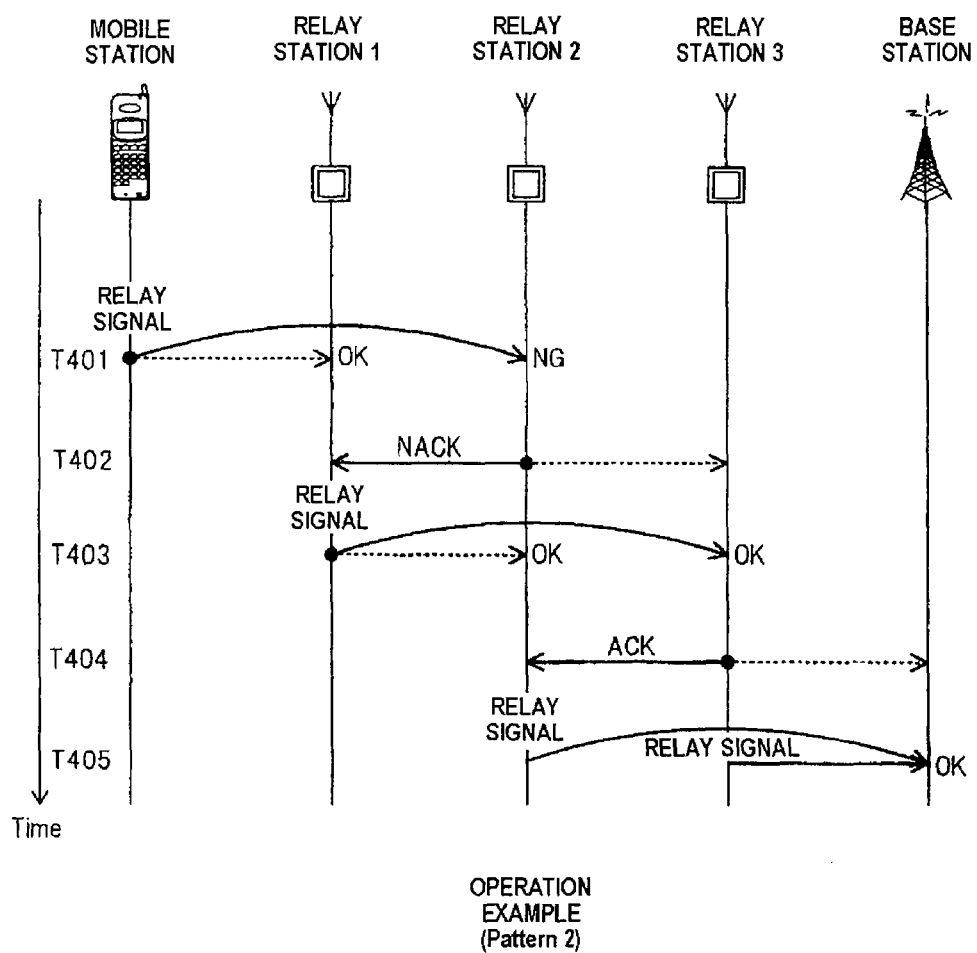
FIG. 4 illustrates an operation example (pattern 2) of the radio communication method according to the first embodiment of the invention.

FIG. 4 shows an operation example (pattern 2). Pattern 2 is a case in which, when the mobile station transmits a signal, the relay station 1 succeeds in receiving the signal and the relay station 2 fails in receiving the signal (T401). Since the relay station 2 fails in receiving the signal, the relay station 2 transmits NACK to the relay station 1 that is one hop upstream therefrom (T402). When the relay station 1 receives NACK from the relay station 2 (T402), the relay station 1 determines that the relay station 2 cannot relay the signal.

The relay station 1 transmits a signal with an MCS set for transmission from the relay station 1 to the relay station 3 (T403). The relay station 3 also receives NACK transmitted from the relay station 2 (T402), and predicts the transmission of the relay signal from the relay station 1 to the relay station 3.

The relay station 3 receives the signal transmitted from the relay station 1 (T403). When succeeding in receiving the signal, the relay station 3 transmits ACK to the relay station 2 that is one hop upstream therefrom (T404). When receiving ACK (T404), the relay station 2 transmits the relay signal with the same MCS used by the relay station 3, which is one hop downstream therefrom, to transmit the relay signal and at the same transmission timing as the relay station 3 transmits the relay signal, similar to the operation of the relay station 1 in the pattern 1 (T405). The base station receives the signals from the relay station 2 and the relay station 3 (T405). Therefore, a diversity effect is obtained.

As such, in the pattern 2, instead of the mobile station, the relay station 1 relays the signal that failed to be received by the relay station 2 to the relay station 3. Therefore, it is possible to relay a signal to the relay station that is one hop downstream during retransmission.

(Pattern 3)

Figure 5:
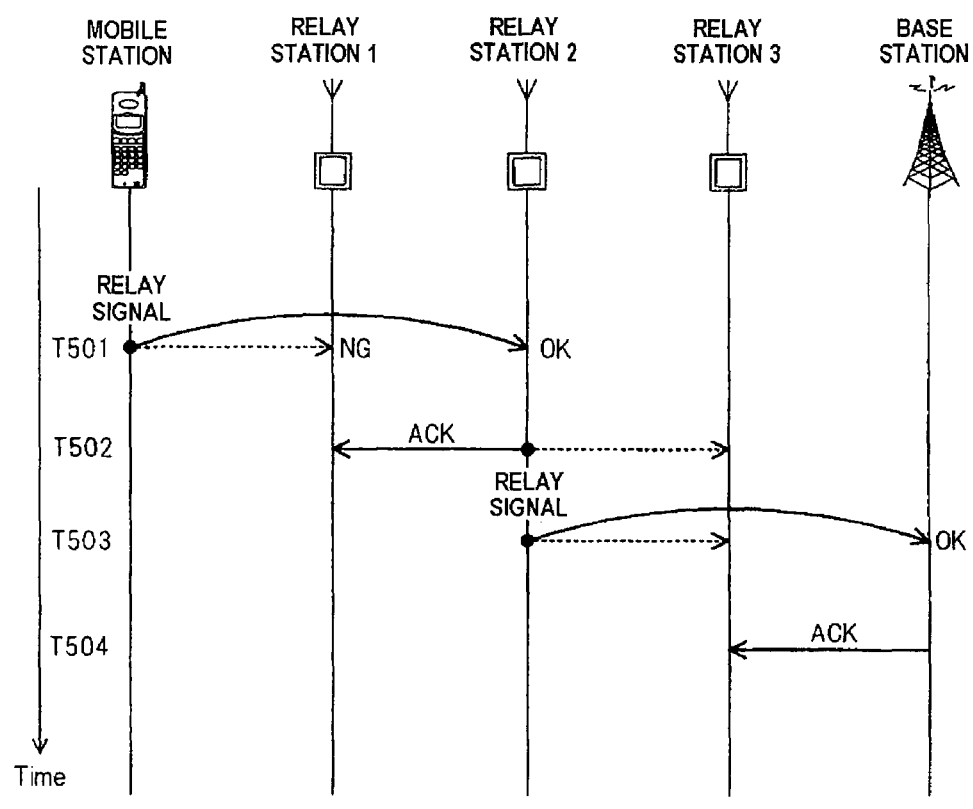
FIG. 5 illustrates an operation example (pattern 3) of the radio communication method according to the first embodiment of the invention.

FIG. 5 shows an operation example (pattern 3). The pattern 3 is a case in which, when the mobile station transmits a signal, the relay station 1 fails in receiving the signal and the relay station 2 succeeds in receiving the signal (T501). Since the relay station 2 succeeds in receiving the signal, the relay station 2 transmits ACK to the relay station 1 that is one hop upstream therefrom (T502). When receiving ACK (T502), the relay station 1 determines that the relay station 2 transmits the relay signal and does not transmit NACK to the mobile station even though it fails in receiving the signal.

The relay station 2 sets an MCS for transmitting signals to the base station and transmits the relay signal with the set MCS (T503). In this case, the relay station 3 receives the relay signal transmitted from the relay station 2 (T503). When succeeding in receiving the signal transmitted from the relay station 2 (T503: OK), the base station transmits ACK to the relay station 3 that is one hop upstream therefrom (T504).

As such, in the pattern 3, even when the relay station 1 fails in receiving the signal, it is possible to transmit the relay signal to the base station since the relay station 2 succeeds in receiving the signal. Even when the relay station 1 fails in receiving the signal, the mobile station does not need to retransmit the relay signal since the relay station 1 does not transmit a retransmission request (NACK).

(Pattern 4)

Figure 6:
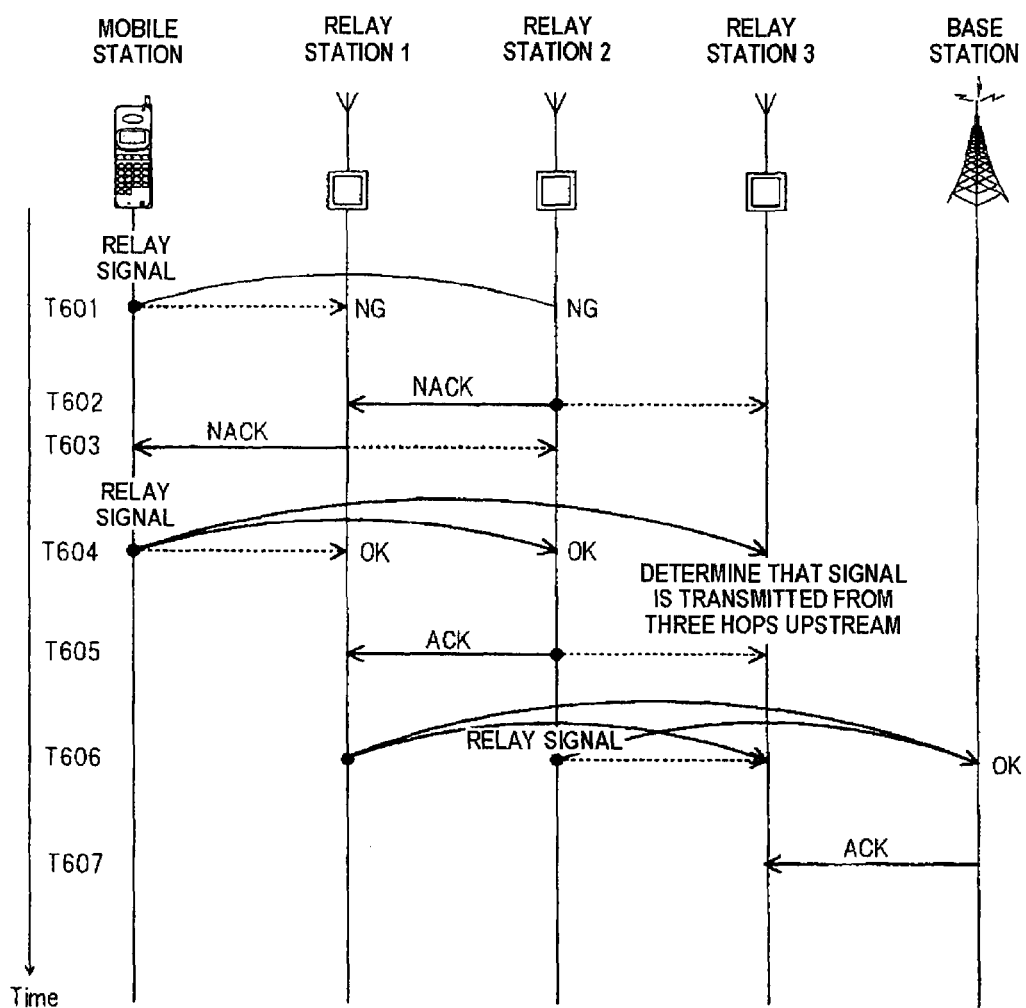
FIG. 6 illustrates an operation example (pattern 4) of the radio communication method according to the first embodiment of the invention.

FIG. 6 shows an operation example (pattern 4). The pattern 4 is a case in which, when the mobile station transmits a signal, both the relay station 1 and the relay station 2 fail in receiving the signal (T601). Since the relay station 2 fails in receiving the signal, the relay station 2 transmits NACK to the relay station 1 that is one hop upstream therefrom (T602). Since both the relay station 1 and the relay station 2 fail in receiving the signal, the relay station 1 transmits NACK to the mobile station (T603).

When receiving NACK from the relay station 1 (T603), the mobile station retransmits the relay signal (T604). In this case, the mobile station sets the MCS used by the mobile station to transmit signals to the relay station 2 and relays the relay signal with the set MCS (T604). After receiving NACK from the relay station 2 (T602), the relay station 3 predicts the retransmission of the relay signal from the relay station 1.

However, since the relay station 1 also fails in receiving the signal, the relay station 3 receives the signal from the mobile station, not the signal from the relay station 1 (T604). When receiving the signal from the mobile station, the relay station 3 determines that the signal is transmitted from the mobile station that is three hops upstream therefrom and stores the received signal in the buffer. However, the relay station 3 does not transmit ACK/NACK.

When succeeding in receiving the relay signal (T604: OK), the relay station 2 transmits ACK to the relay station 1 (T605). Similar to the pattern 1, the relay station 1 and the relay station 2 transmit the relay signal to the base station with the same MCS used by the relay station 2 to transmit signals to the base station and at the same transmission timing when the relay station 2 transmits a signal to the base station (T606). When succeeding in receiving the relay signal (T606: OK), the base station transmits ACK to the relay station 3 (T607).

Figure 7:
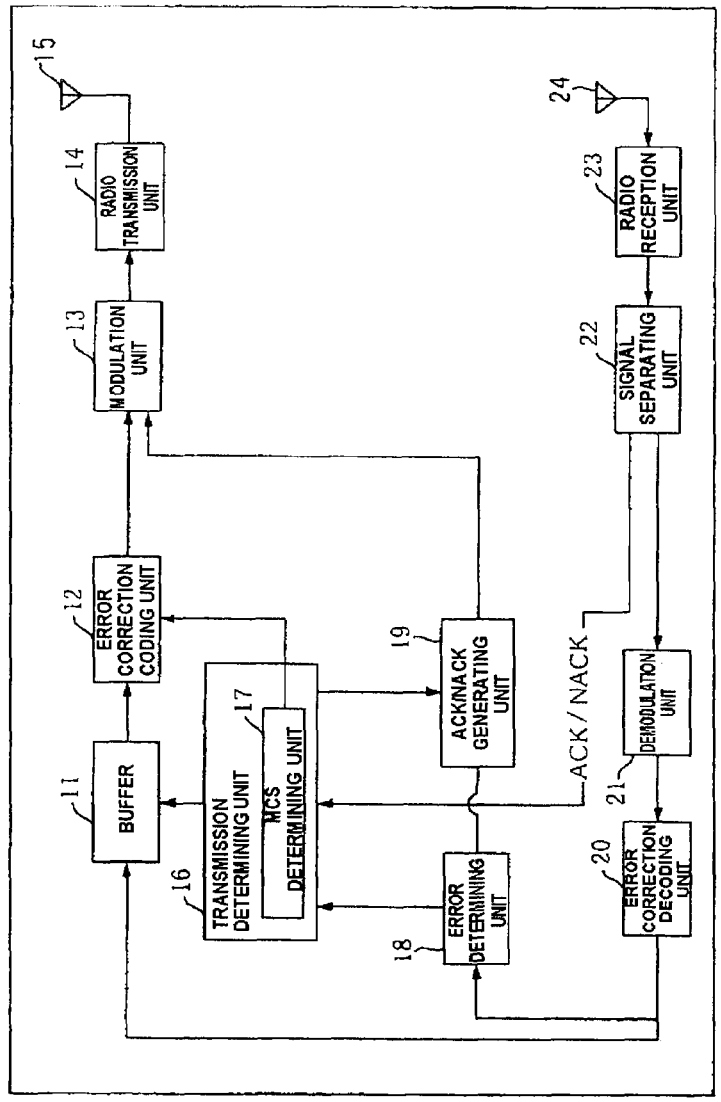
FIG. 7 is a block diagram illustrating the structure of a relay station device according to the first embodiment of the invention.

[Block diagram of relay station] FIG. 7 is a block diagram illustrating the structure of a relay station device according to this embodiment. A radio reception unit 23 receives a signal from the mobile station or the relay station through an antenna 24, performs radio processing, such as down-conversion, on the received signal, and outputs the processed signal to the signal separating unit 22.

The signal separating unit 22 separates the signal output from the radio reception unit 23 into a relay signal and an ACK/NACK signal. The relay signal is output to a demodulation unit 21. ACK/NACK is output to a transmission determining unit 16. The demodulation unit 21 demodulates the relay signal and outputs the demodulated signal to an error correction decoding unit 20.

The error correction decoding unit 20 performs error correction decoding on the relay signal, and outputs the decoded signal to an error determining unit 18 and a buffer 11. The error determining unit 18 determines whether there is an error in the relay signal with CRC (Cyclic Redundancy Check). The determination result is output to the transmission determining unit 16 and an ACK/NACK generating unit 19.

The transmission determining unit 16 determines whether there is an error in the relay signal (output from the error determining unit 18), whether to transmit the relay signal on the basis of ACK/NACK (output from the signal separating unit 22) received from the relay station that is one hop downstream therefrom, and whether to transmit ACK/NACK. An MCS determining unit 17 in the transmission determining unit 16 determines an MCS for the relay signal. The operation of the transmission determining unit 16 will be separately described with reference to a flowchart. A transmission instruction generated by the transmission determining unit 16 is output to the buffer 11 and the ACK/NACK generating unit 19. The MCS determined by the MCS determining unit 17 is output to the error correction coding unit 12 and a modulation unit 13.

The ACK/NACK generating unit 19 generates ACK when there is no error in the relay signal, and generates NACK when there is an error in the relay signal, on the basis of the output from the error determining unit 18. In addition, the ACK/NACK generating unit 19 outputs ACK/NACK to the modulation unit 13 when there is a transmission instruction from the transmission determining unit 16. The buffer 11 buffers the signal. When there is an instruction from the transmission determining unit 16, the buffer 11 outputs the relay signal to the error correction coding unit 12.

The error correction coding unit 12 performs error correction coding on the relay signal at the encoding ratio indicated by the MCS determining unit 17 and outputs the coded signal to the modulation unit 13. The modulation unit 13 modulates the relay signal with a modulation multi-value number indicated by the MCS determining unit 17 and outputs the modulated signal to a radio transmission unit 14. The radio transmission unit 14 performs radio processing, such as up-conversion, on the modulated signal and relays and transmits the processed data from an antenna 15.

Figure 8:
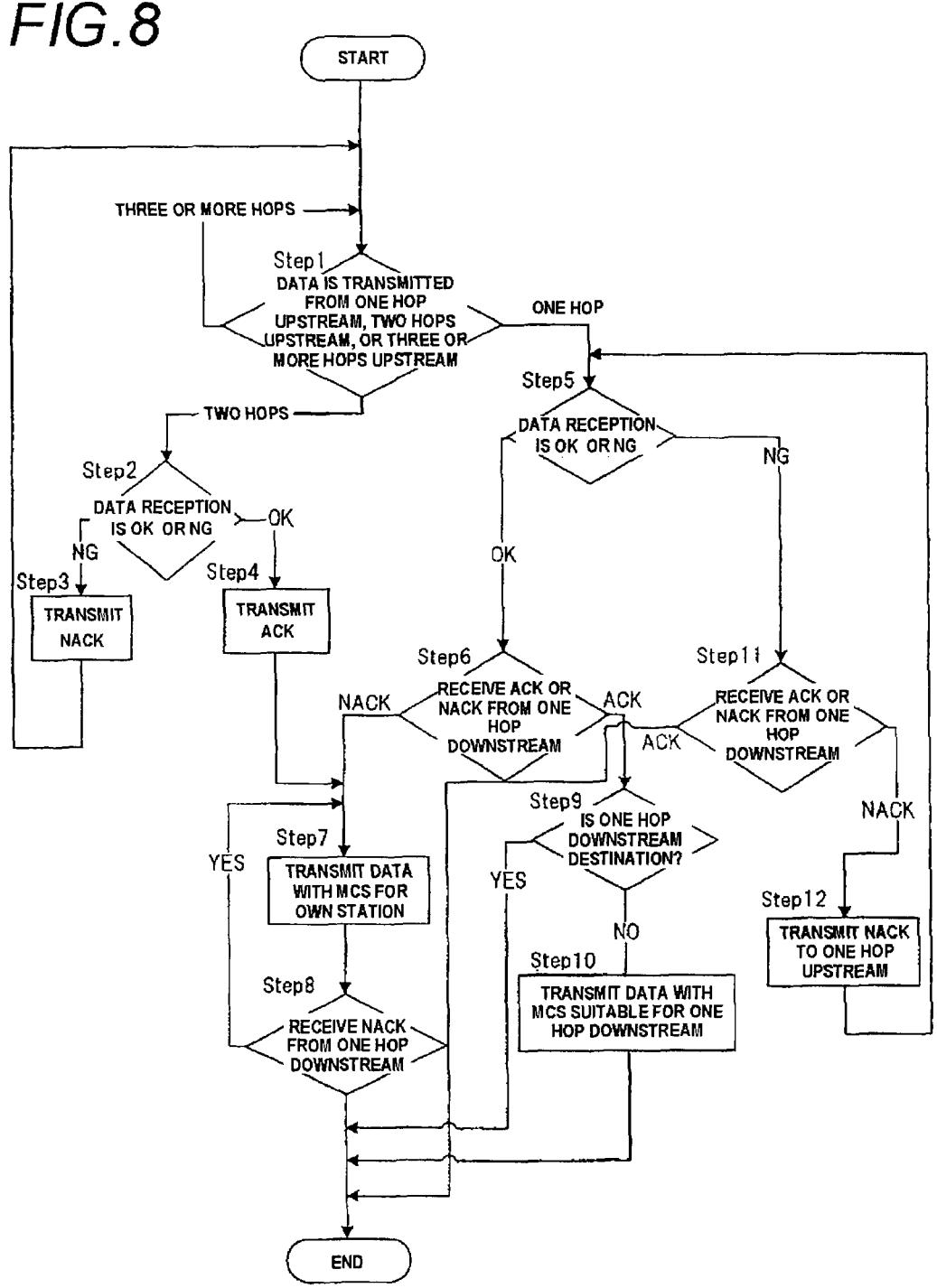
FIG. 8 is a flowchart illustrating the operation of a transmission determining unit according to the first embodiment of the invention.

FIG. 8 is a flowchart (Embodiment 1) illustrating the operation of the transmission determining unit 16 in the relay station device. In [Step 1], the transmission determining unit 16 determines the number of hops away from a transmission source terminal to the upstream side on the basis of the address of the transmission source, transmission timing, or a frequency. When the terminal (the relay station or the mobile station) that transmits data is three or more hops upstream from the relay station including the transmission determining unit 16, the transmission determining unit 16 returns to Step 1. When the terminal is two hops upstream from the relay station, the transmission determining unit 16 proceeds to Step 2. When the terminal is one hop upstream from the relay station, the transmission determining unit 16 proceeds to Step 5.

In [Step 2], the transmission determining unit 16 proceeds to Step 4 when succeeding in receiving data, and proceeds to Step 3 when failing in receiving data, on the basis of the output from the error determining unit 18. In [Step 3], the transmission determining unit 16 transmits NACK and returns to Step 1. In [Step 4], the transmission determining unit 16 transmits ACK and proceeds to Step 7. In [Step 5], when succeeding in receiving data, the transmission determining unit 16 proceeds to Step 6. When failing in receiving data, the transmission determining unit 16 proceeds to Step 11.

Then, in [Step 6], when the transmission determining unit 16 receives ACK from the base station or the relay station that is one hop downstream therefrom, the transmission determining unit 16 proceeds to Step 9. When receiving NACK, the transmission determining unit 16 proceeds to Step 7. In [Step 7], the transmission determining unit 16 determines to transmit relay data with an MCS for the relay station including the transmission determining unit 16. In this case, when the base station (destination) is one hop downstream, the MCS determining unit 17 in the transmission determining unit 16 sets an MCS for transmission to the base station. When the base station (destination) is not one hop downstream, the MCS determining unit 17 sets an MCS for transmission to the base station or the relay station that is two hops downstream therefrom. Then, the transmission determining unit 16 proceeds to Step 8.

Then, in [Step 8], when the transmission determining unit 16 receives NACK from the relay station that is one hop downstream therefrom, the transmission determining unit 16 proceeds to Step 7. When not receiving NACK, the transmission determining unit 16 ends its operation. In [Step 9], when the base station (destination) is one hop downstream, the transmission determining unit 16 ends its operation. When the relay station, not the destination, is one hop downstream, the transmission determining unit 16 proceeds to Step 10.

Then, in [Step 10], the transmission determining unit 16 determines to transmit the relay signal with the same MCS used by the relay station, which is one hop downstream, to transmit the relay signal and ends its operation. In [Step 11], when receiving ACK from the relay station that is one hop downstream, the transmission determining unit 16 ends its operation. When receiving NACK, the transmission determining unit 16 proceeds to Step 12. In [Step 12], the transmission determining unit 16 determines to transmit NACK to the relay station that is one hop upstream therefrom and proceeds to Step 5.

Figure 9:
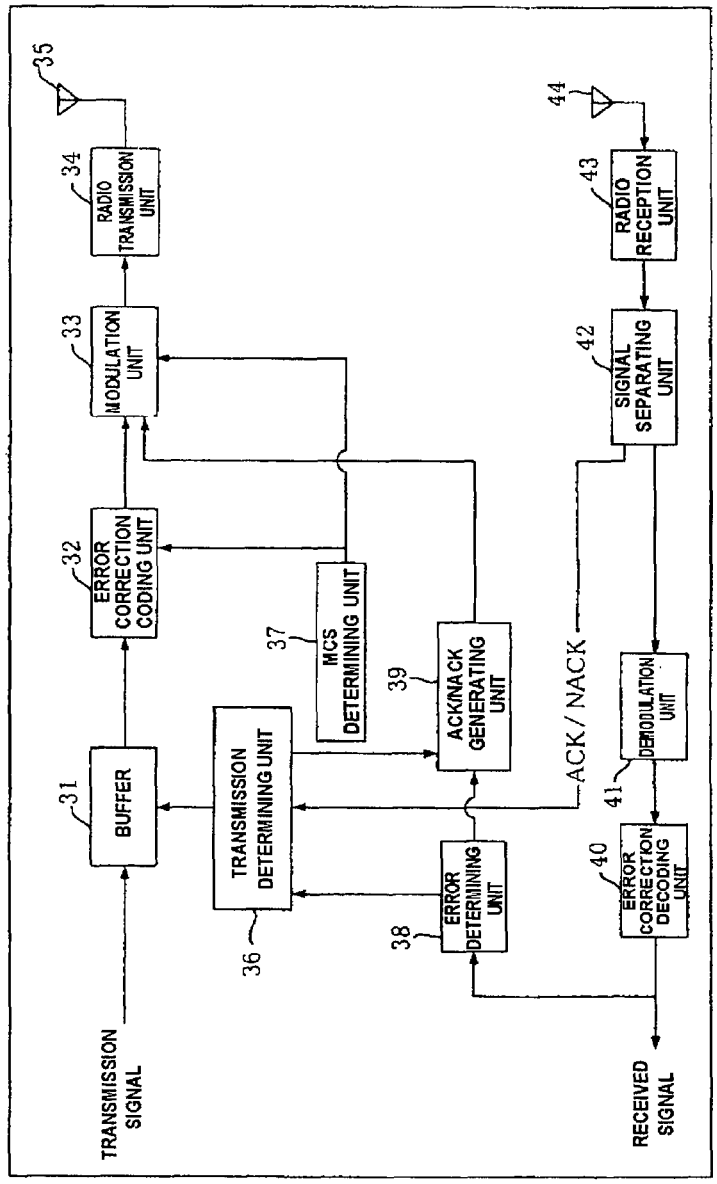
FIG. 9 is a block diagram illustrating the structure of a mobile station device according to the first embodiment of the invention.

FIG. 9 is a block diagram illustrating the structure of a mobile station device according to this embodiment. A description of the same components as those of the relay station shown in the block diagram of FIG. 7 will be omitted. In the sequence diagrams (FIGS. 3 to 6), for example, the mobile station is a transmission source and the base station is a destination. However, in the block diagram, the mobile station is configured to be a transmission source and a destination.

When NACK is input from the signal separating unit 42, the transmission determining unit 36 outputs NACK to the buffer 31 (instructs the transmission of NACK). The MCS determining unit 37 sets an MCS for the base station or the relay station that is two hops downstream and outputs it to the error correction coding unit 32 and the modulation unit 33. The ACK/NACK generating unit 39 outputs ACK to the modulation unit 33 when succeeding in receiving an input from the error determining unit 38, and outputs NACK to the modulation unit 33 when failing in receiving the input.

Figure 10:
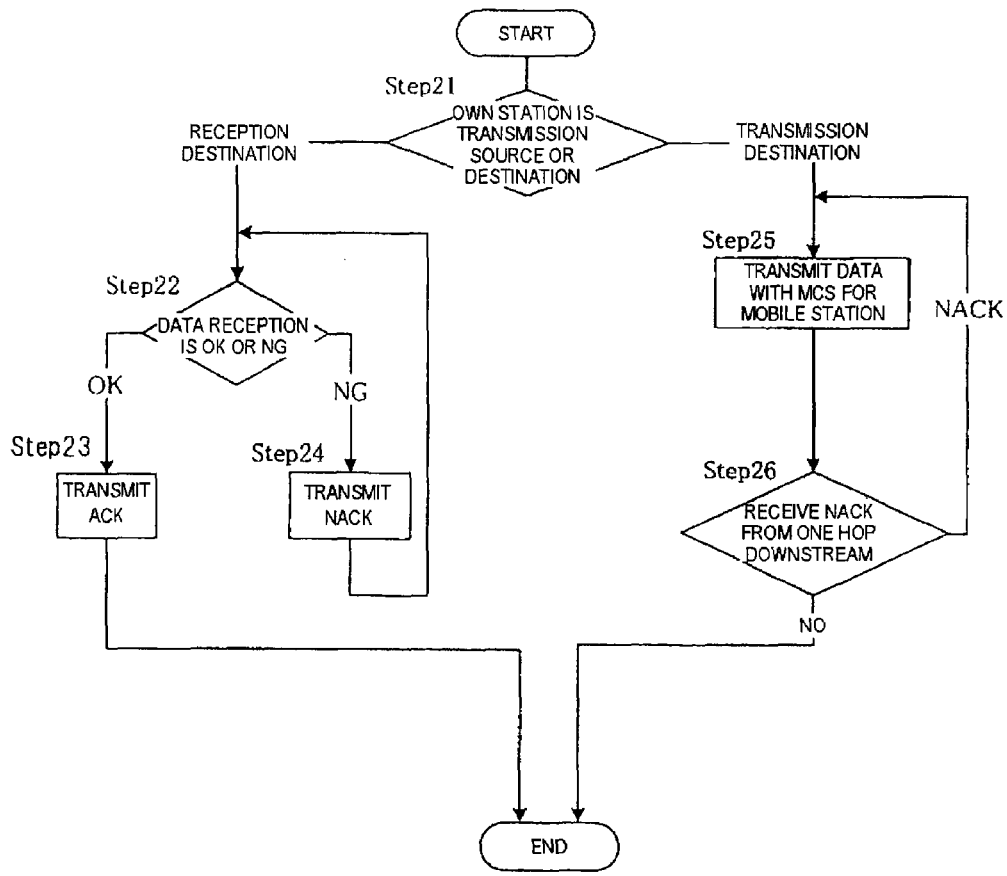
FIG. 10 is a flowchart illustrating the operation of a transmission determining unit 36 and an MCS determining unit 37 according to the first embodiment of the invention.

FIG. 10 is a flowchart illustrating the operation of the transmission determining unit 36 and the MCS determining unit 37. In [Step 21], the transmission determining unit 36 determines whether the station including the transmission determining unit 36 is a transmission source or a destination. That is, the transmission determining unit 36 determines that the station is a transmission source when transmission resources are allocated by scheduling and determines that the station is a destination when reception resources are allocated by scheduling. When it is determined that the station is a transmission source, the determining unit 36 proceeds to Step 25. When it is determined that the station is a destination, the determining unit 36 proceeds to Step 22. In [Step 22], the transmission determining unit 36 proceeds to Step 23 when succeeding in receiving data, and proceeds to Step 24 when failing in receiving data, on the basis of the output from the error determining unit 38. The mobile station device may be operated as a transmission source and a destination at the same time.

Then, in [Step 23], the transmission determining unit 36 instructs the ACK/NACK generating unit 39 to transmit ACK and ends its operation. In [Step 24], the transmission determining unit 36 instructs the ACK/NACK generating unit 39 to transmit NACK and proceeds to Step 22. In [Step 25], the MCS determining unit 37 sets an MCS used by the mobile station to transmit a signal to the base station or the relay station that is two hops downstream therefrom. The transmission determining unit 36 instructs the buffer 31 to transmit the relay signal and proceeds to Step 26. In [Step 26], when receiving NACK from the relay station that is one hop downstream, the transmission determining unit 36 proceeds to Step 25. When not receiving NACK, the transmission determining unit 36 ends its operation.

As such, according to this embodiment, in the multi-stage relay, a relay station that transmits the relay signal and another relay station that is one hop upstream from the relay station perform cooperative relay with the same MCS. Therefore, it is possible to improve the reception quality of signals by a relay destination.

A relay station transmits signals to another relay station that is two hops downstream therefrom. Therefore, when the relay station that is two hops downstream succeeds in receiving signals, it can relay the signals to another relay station that is two hops downstream therefrom. Therefore, it is possible to reduce the amount of delay.

When a relay station fails in receiving signals, the relay station transmits a retransmission request to another relay station that is one hop upstream therefrom. The relay station receiving the retransmission request transmits a relay signal to another relay station that is two hops downstream therefrom. Therefore, even during retransmission, it is possible to transmit a relay signal to the relay station that is one hop downstream.

When a relay station transmits ACK to another relay station that is one hop upstream therefrom, an MCS may be designated. In the case in which a relay station (relay station 2) that is one hop downstream from a target relay station (relay station 1) receives NACK from another relay station (relay station 3) that is two hops downstream therefrom, when the relay station (relay station 2) fails in receiving a signal, the relay station transmits NACK. However, when succeeding in receiving a signal, the relay station may transmit ACK.

The above-described embodiment may be performed only when an MSC is designated by control information transmitted from the base station, the relay station, or the mobile station. In addition, the above-described embodiment may be performed only in the section designated by the control information.

In the pattern 4 according to the above-described embodiment, after receiving NACK from the relay station 2, the relay station 3 receives a relay signal. When it is determined that the relay signal is transmitted from the relay station that is three hops upstream from the relay station 3, the relay station 3 stores the received signal in the buffer, but does not perform the next relay operation. However, when succeeding in receiving a relay signal, the relay station 3 may transmit the relay signal with the same MCS used by the relay station 2 to transmit the relay signal.

Embodiment 2

This embodiment is different from Embodiment 1 in that the ACK/NACK signal can be received by the relay station that is two hops upstream. When the quality of a line between two hops is high, ACK/NACK transmitted from a relay station that is two hops downstream can be transmitted to a mobile station or another relay station that is two hops upstream. When the mobile station or the relay station receives ACK from the relay station that is two hops downstream therefrom, it ends the transmission of the relay signal. When receiving NACK, the mobile station or the relay station transmits the relay signal. In this case, the MCS set for the relay signal is the same set in the relay station that is one hop downstream.

In this way, when a relay station, which is a transmission source, receives NACK from another relay station that is two hops downstream therefrom, the relay station can retransmit the relay signal without determining whether a relay station that is one hop downstream can receive a signal. When the relay station that is one hop downstream fails in receiving a signal, in Embodiment 1, it is difficult to retransmit the signal until the relay station 1 receives NACK. However, in this embodiment, it is possible to instantaneously retransmit the signal. Therefore, it is possible to reduce the amount of delay in retransmission. When the relay station that is one hop downstream succeeds in receiving a signal, cooperative relay can be performed by the same MCS for the relay station that is one hop downstream. Therefore, it is possible to improve the reception quality of a retransmission signal.

Figure 11:
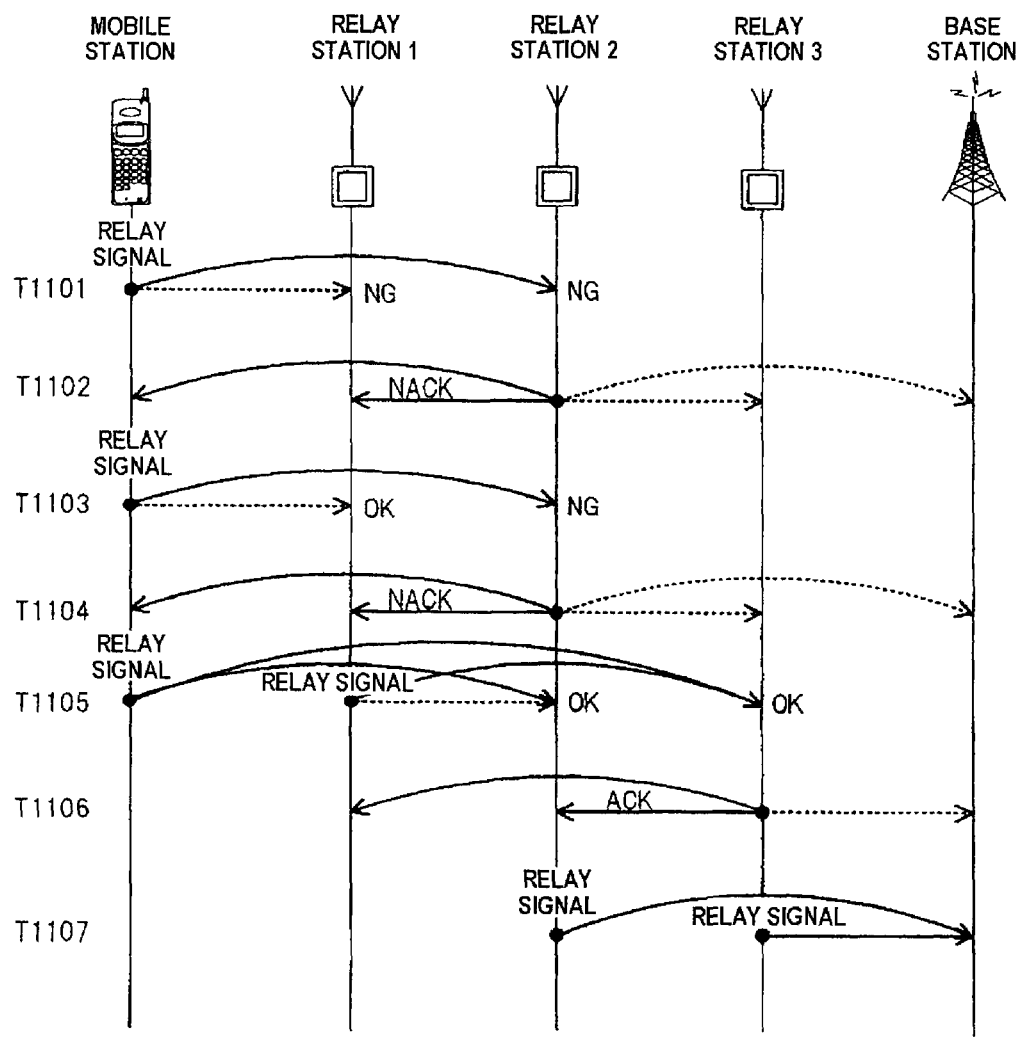
FIG. 11 illustrates an operation example of a radio communication method according to a second embodiment of the invention.

FIG. 11 illustrates an example of the operation of this embodiment. Similar to Embodiment 1, the mobile station is a transmission source, the base station is a destination, and a relay station 1, a relay station 2, and a relay station 3 are provided between the mobile station and the base station. The mobile station, the relay station 1, the relay station 2, the relay station 3, and the base station are arranged in this order.

First, the mobile station transmits a relay signal to the relay station 2 (T1101). Similar to Embodiment 1, the relay station 1 also receives the signal from the mobile station (T1101). Since the relay station 2 fails in receiving the relay signal, the relay station 2 transmits NACK to the relay station 1 and the mobile station (T1102).

Since the relay station 1 fails in receiving the relay signal (T1101: NG) and receives NACK from the relay station 2 (T1102), the relay station 1 prepares to receive a retransmission signal from the mobile station. Since the mobile station receives NACK from the relay station 2 that is two hops downstream therefrom (T1102), the mobile station predicts cooperative relay with the relay station 1 that is one hop downstream therefrom, and retransmits the relay signal with the same MCS used by the relay station 1 (T1103).

The relay station 1 and the relay station 2 receive the relay signal retransmitted from the mobile station (T1103). Since the relay station 2 fails in receiving the relay signal (T1103: NG), the relay station 2 transmits NACK to the relay station 1 and the mobile station (T1104). Since the relay station 1 succeeds in receiving the relay signal (T1103: OK), the relay station 1 transmits the relay signal to the relay station 3 with the MCS set by the relay station 1 (T1105).

Since the mobile station receives NACK from the relay station 2 that is two hops downstream therefrom, similar to the previous step (T1104), the mobile station predicts cooperative relay with the relay station 1 that is one hop downstream therefrom and retransmits the relay signal with the same MCS used by the relay station 1 (T1105).

The relay station 2 and the relay station 3 receive the relay signal transmitted from the mobile station and the relay station 1 (T1105). When the relay station 3 succeeds in receiving the relay signal (T1105: OK), the relay station 3 transmits ACK to the relay station 2 and the relay station 1 (T1106). After transmitting ACK, the relay station 3 transmits the relay signal to the base station (T1107).

When receiving ACK from the relay station 3 (T1106), the relay station 2 transmits the relay signal with the same MCS used by the relay station 3 to transmit signals to the base station (T1107). Since the relay station 1 receives ACK from the relay station 3 that is two hops downstream therefrom (T1106), the relay station 1 stops the relay operation.

Figure 12:
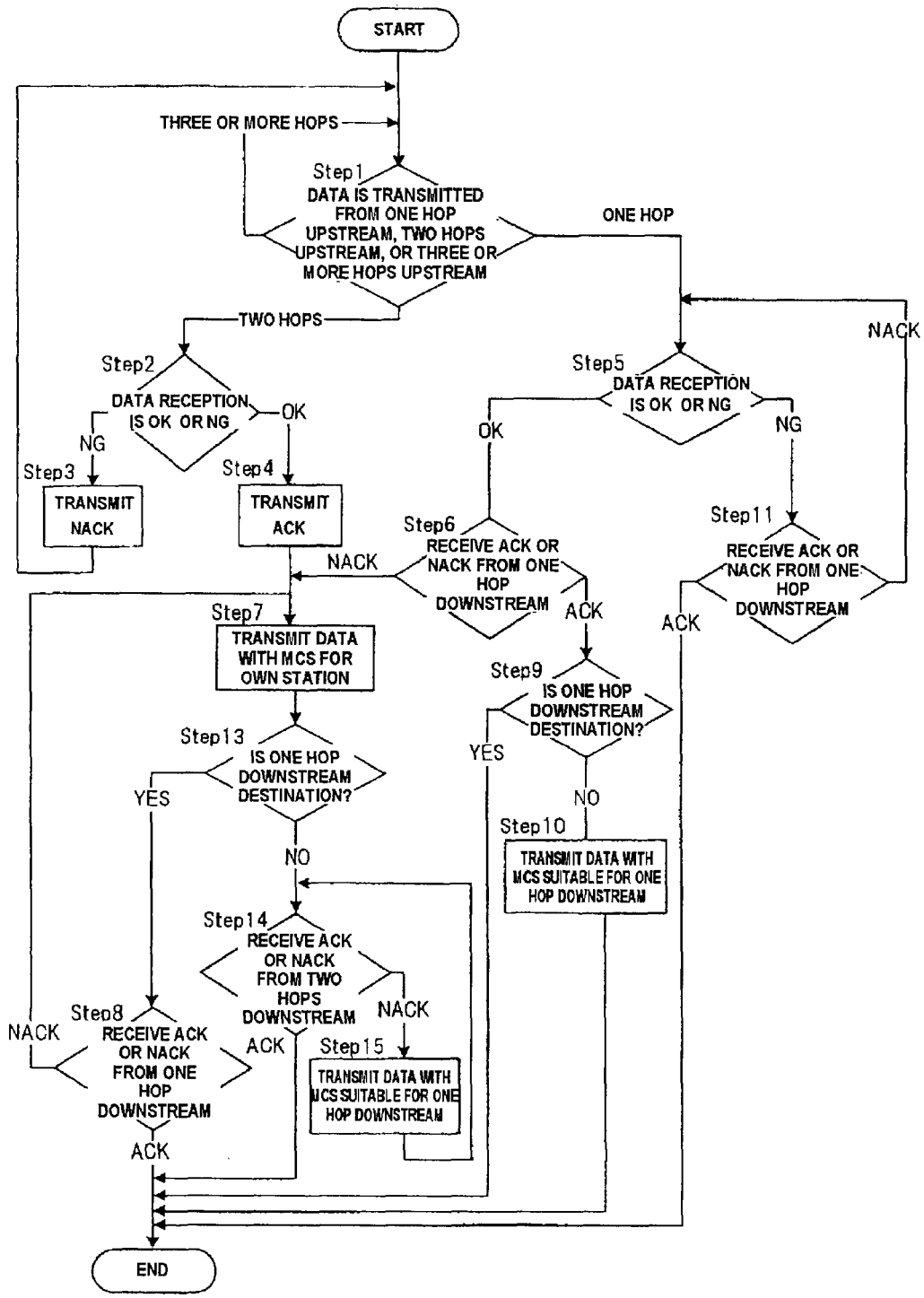
FIG. 12 is a flowchart illustrating the operation of a transmission determining unit according to the second embodiment of the invention.

A block diagram illustrating the structure of a relay station device is the same as that of FIG. 7, but is different from that of FIG. 7 in the operation of the transmission determining unit. FIG. 12 is a flowchart illustrating the operation of the transmission determining unit according to this embodiment. A description of the same portions as those in the flowchart according to Embodiment 1 (FIG. 8) will be omitted. The flowchart according to this embodiment is different from that according to Embodiment 1 (FIG. 8) in that Step 12 is removed, Step 8 is changed, and connection in Step 7 and Step 11 is changed.

In [Step 7], the transmission determining unit 16 instructs the buffer 11 to transmit the relay data with an MCS for the relay station including the transmission determining unit 16. In this case, when the base station (destination) is one hop downstream, the MCS determining unit 17 sets an MCS for transmission to the base station. When the base station (destination) is not one hop downstream, the MCS determining unit 17 sets an MCS for transmission to the base station or the relay station that is two hops downstream therefrom. Then, the transmission determining unit 16 proceeds to Step 13.

Then, in [Step 8], when the transmission determining unit 16 receives NACK from the relay station that is one hop downstream therefrom, it proceeds to Step 7. When receiving ACK, the transmission determining unit 16 ends its operation. In [Step 11], when the transmission determining unit 16 receives ACK from the relay station that is one hop downstream therefrom, it ends its operation. When receiving NACK, the transmission determining unit 16 proceeds to Step 12.

Then, in [Step 13], when the base station (destination) is one hop downstream, the transmission determining unit 16 proceeds to Step 8. When the destination is not one hop downstream, the transmission determining unit 16 proceeds to Step 14. In [Step 14], when receiving ACK from the relay station that is two hops downstream, the transmission determining unit 16 ends the relay operation. When receiving NACK from the relay station, the transmission determining unit 16 proceeds to Step 15. In [Step 15], the transmission determining unit 16 transmits the relay signal with the same MCS used by the relay station, which is one hop downstream, to transmit the relay signal and proceeds to Step 14.

Figure 13:
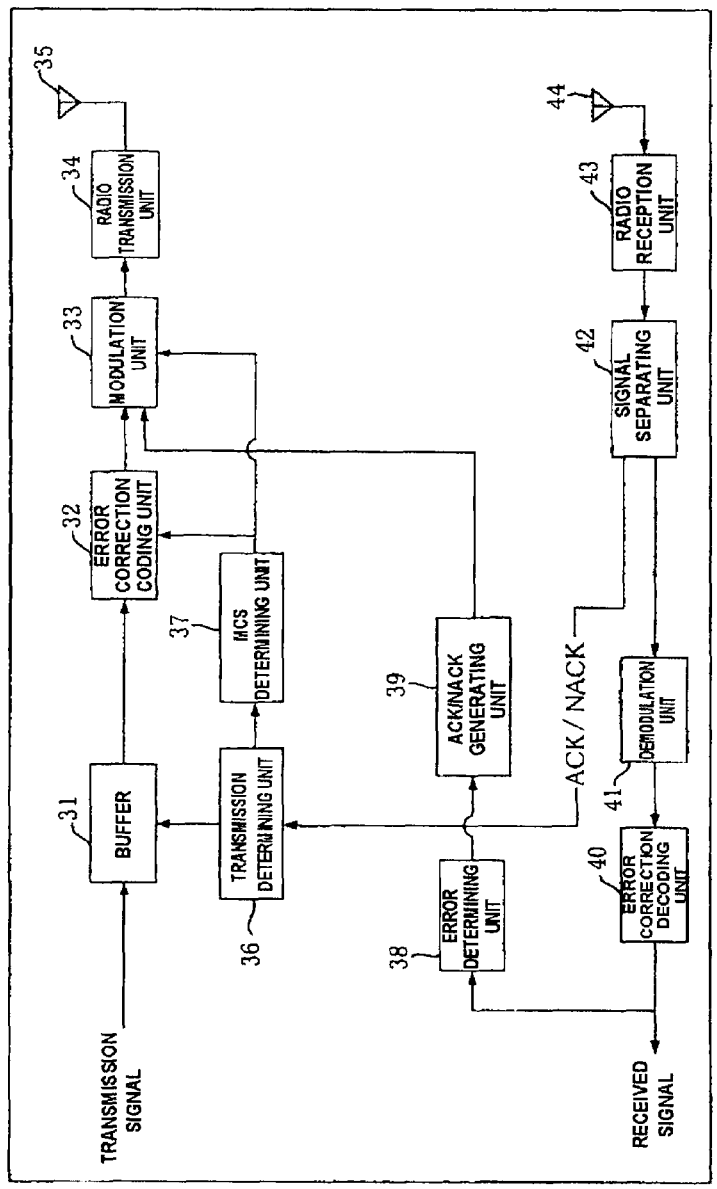
FIG. 13 is a block diagram illustrating the structure of a mobile station according to the second embodiment of the invention.

FIG. 13 is a block diagram illustrating the structure of the mobile station. In FIG. 13, a description of the same blocks as those in FIG. 9 will be omitted. The structure shown in FIG. 13 is different from that shown in FIG. 9 in the operation of the transmission determining unit 36 and the MCS determining unit 37. The transmission determining unit 36 ends the transmission of signals when there is ACK in the ACK/NACK information received from the relay station that is two hops downstream therefrom, and outputs NACK to the MCS determining unit 37 when there is NACK in the ACK/NACK information.

The MCS determining unit 37 determines an MCS used by the mobile station including the MCS determining unit 37 to transmit signals to the relay station that is two hops downstream therefrom in the initial transmission of a transmission signal, and determines an MCS used by the relay station that is one hop downstream therefrom when NACK is input from the transmission determining unit 36. The determined MCS is output to the error correction coding unit 32 and the modulation unit 33.

Figure 14:
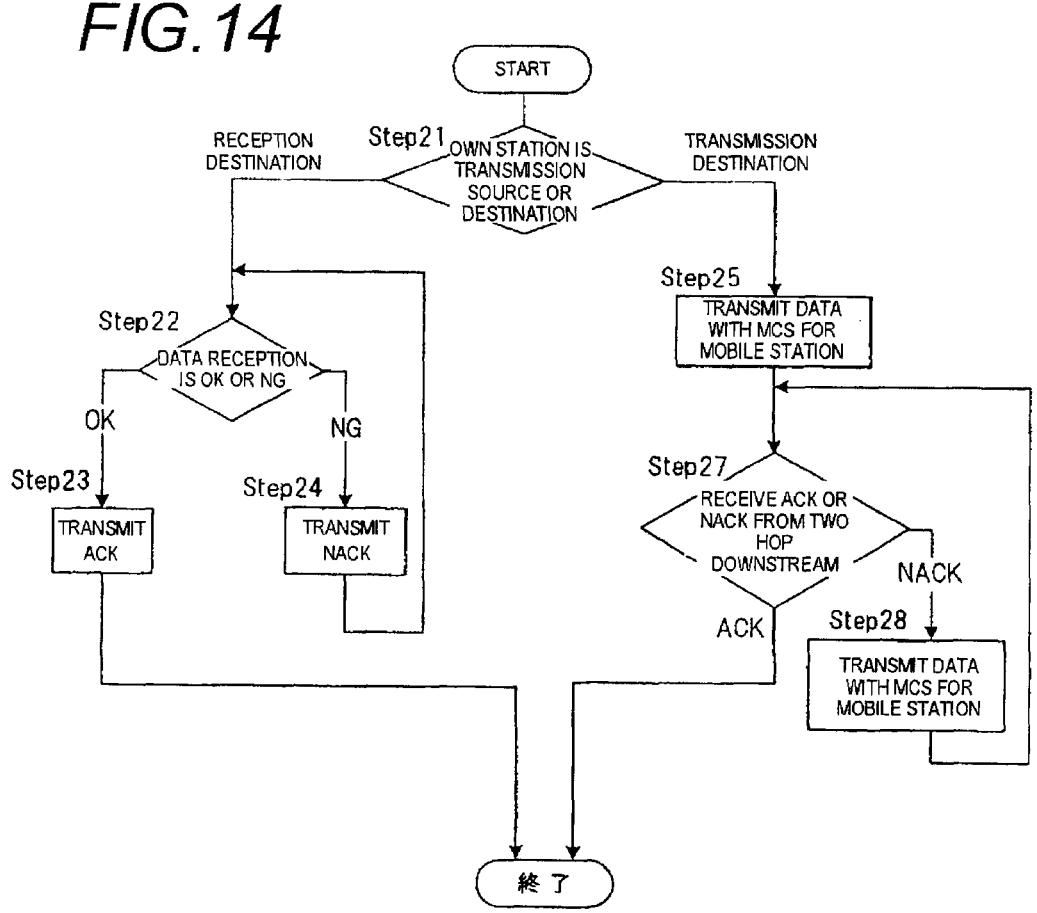
FIG. 14 is a flowchart illustrating the operation of a transmission determining unit 36 and an MCS determining unit 37 of the mobile station according to the second embodiment of the invention.

FIG. 14 is a flowchart illustrating the operation of the transmission determining unit 36 and the MCS determining unit 37 of the mobile station according to this embodiment. A description of the same portions as those in the flowchart (FIG. 10) according to Embodiment 1 will be omitted. The flowchart according to this embodiment is different from that according to Embodiment 1 in that Step 26 is removed and connection in Step 25 is changed.

In [Step 25], in the initial transmission of a transmission signal, the MCS determining unit 37 sets an MCS for transmitting signals to the base station or the relay station that is two hops downstream therefrom and transmits the transmission signal with the set MCS. Then, the MCS determining unit 37 proceeds to Step 27. In [Step 27], when receiving ACK from the relay station that is two hops downstream, the MCS determining unit 37 ends the transmission of the signal. When receiving NACK from the relay station, the MCS determining unit 37 proceeds to Step 28. In [Step 28], the MCS determining unit 37 sets the same MCS used by the relay station, which is one hop downstream, to transmit signals, transmits a retransmission signal with the set MCS, and proceeds to Step 27.

As such, in this embodiment, when NACK is received from the relay station that is two hops downstream, it is possible to relay a retransmission signal, without receiving ACK/NACK from the relay station that is one hop downstream. Therefore, it is possible to reduce the amount of delay in the transmission of a retransmission request when the relay station that is one hop downstream and the relay station that is two hops downstream both fail in receiving the relay signals. In addition, when the relay station that is one hop downstream succeeds in receiving the relay signal, the same MCS is set to the relay stations such that the relay stations perform cooperative relay. Therefore, it is possible to improve reception quality.

The relay methods may be switched such that the relay method according to Embodiment 1 is used when the quality of a line between a relay station and another relay station that is two hops downstream is low and the relay method according to Embodiment 2 is used when the quality of the line between the relay stations is high. The relay station and the relay station that is two hops downstream share information indicating the relay method to be used during switching.

It may be determined which embodiment is implemented on the basis of the kind of data or QoS (Quality of Service). For example, in the case of VoIP (Voice over Internet Protocol), communication may be performed by the relay method according to Embodiment 2 and data may be transmitted in a hop-by-hop manner (Embodiment 1). Data with high QoS may be transmitted by the relay method according to this embodiment. Data with low QoS may be transmitted in the hop-by-hop manner.

In addition, in the above-described embodiment, the relay station that is two hops downstream may serve as a transmission destination, the relay station that is one hop downstream may serve as a retransmission destination, and the mobile station or the relay station that transmits a relay signal may designate the transmission destination and the retransmission destination. In this case, when data is transmitted, destination information, transmission destination information, and retransmission destination information are all transmitted.

Figure 15:
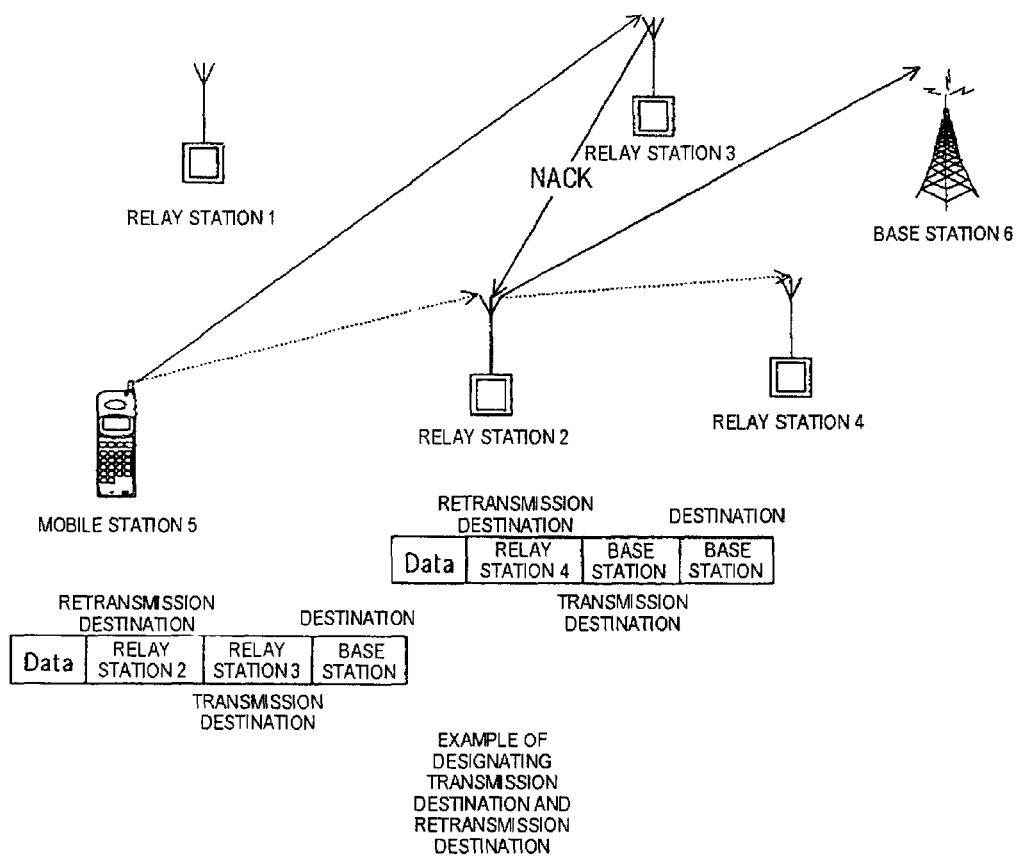
FIG. 15 illustrates an example of designating a transmission destination and a retransmission destination and relaying signals in the embodiment of the invention.

FIG. 15 shows an example in which a transmission destination and a retransmission destination are designated and data is relayed. The mobile station designates the relay station 3 that is three hops downstream therefrom as a transmission destination, designates the relay station 2 that is two hops downstream therefrom as a retransmission destination, designates the base station as a destination, and transmits data to the base station. Since the relay station 3 is designated as the transmission destination, it determines whether to exactly receive a relay signal and transmits ACK/NACK to the relay station 2 designated as the retransmission destination.

When receiving ACK from the relay station designated as the transmission destination, the relay station 2 designated as the retransmission destination transmits the relay signal with the MCS used by the relay station, which is the transmission destination, to transmit the relay signal later. On the other hand, when receiving NACK from the relay station designated as the transmission destination, the relay station 2 designated as the retransmission destination changes the destination information, the transmission destination information, and the retransmission destination information to information for the relay station 2, sets an MCS for transmission to the transmission destination of the relay station 2, and transmits the relay signal. In this example, since NACK is transmitted from the relay station 3, which is the transmission destination, the relay station 2, which is a station for retransmission, transmits the relay signal to the base station, which is a transmission destination, and the relay station 4, which is a retransmission destination.

Embodiment 3

This embodiment is similar to Embodiment 1 in that cooperative relay is performed, but differs therefrom in an MCS setting method during cooperative relay. In Embodiment 1, the MCS is determined according to the downstream relay station. However, in this embodiment, the MCS is determined according to the upstream relay station. The reception range of the ACK/NACK signal is two hops, similar to Embodiment 2.

Specifically, in this embodiment, the relay method varies depending on whether the relay station that is one hop downstream succeeds in receiving a signal transmitted by a transmission source or the relay station that is two hops downstream succeeds in receiving the signal. The relay methods from the mobile station to the relay station are classified into four patterns, which are shown in the following Table 2. Each of the patterns will be described using an operation diagram.

TABLE 2

| | Transmission pattern | | |
|---|---|---|---|
| | Relay station that is one hop downstream (relay station 1) | Relay station that is two hops downstream (relay station 2) | |
| Pattern 1 | OK | OK | Relay station 1 and relay station 2 perform cooperative relay with MCS of relay station 1 |
| Pattern 2 | OK | NG | Relay station 1 transmits signals |
| Pattern 3 | NG | OK | Relay station 2 transmits signals |
| Pattern 4 | NG | NG | Relay station 2 transmits retransmission request to mobile station |

This embodiment differs from Embodiment 1 in that the ACK/NACK signal can be transmitted to the relay station that is two hops upstream. When the quality of a line between two hops is high, the mobile station or the relay station that is two hops upstream can receive ACK/NACK transmitted from a relay station. The mobile station or the relay station ends the transmission of the relay signal when receiving ACK from the relay device that is two hops downstream therefrom and transmits the relay signal when receiving NACK from the relay station. In this case, the MCS for transmitting the relay signal is the same as that set for the relay station that is one hop downstream.

(Pattern 1)

Figure 16:
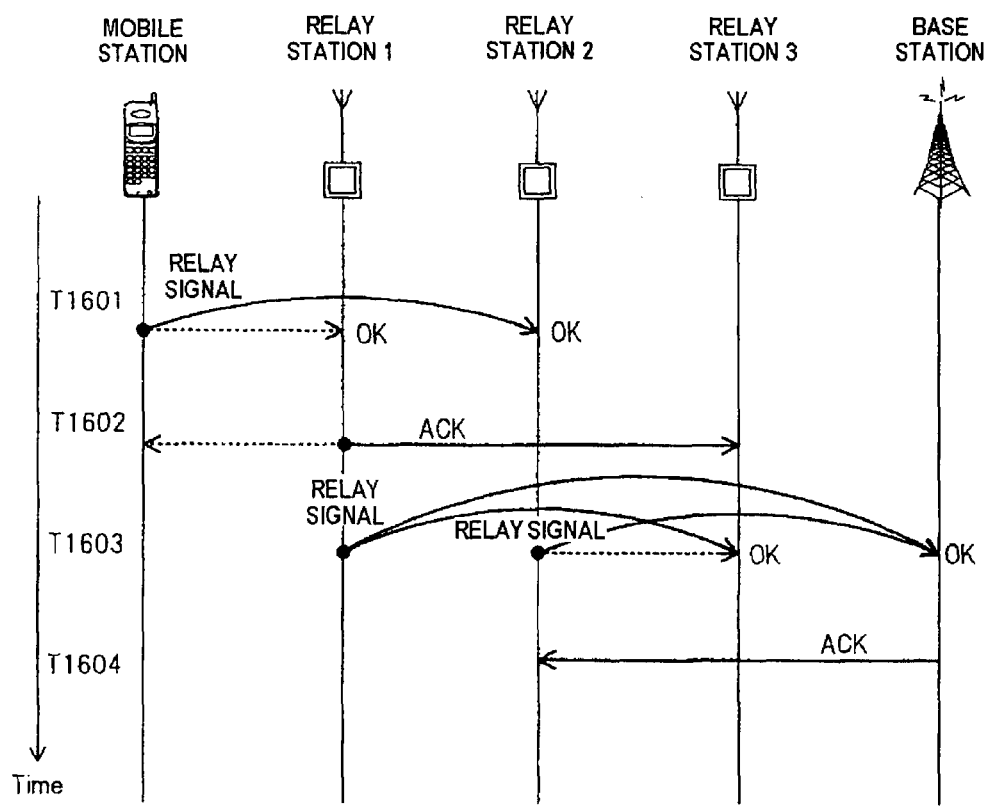
FIG. 16 illustrates an operation example (pattern 1) of a radio communication method according to a third embodiment of the invention.

FIG. 16 shows an operation example (pattern 1). Pattern 1 is a case in which, when the mobile station transmits a signal, both the relay station 1 and the relay station 2 succeed in receiving the signal (T1601). Since the relay station 1 succeeds in receiving the signal, the relay station 1 transmits ACK to the relay station 2 that is one hop downstream therefrom, the relay station 3 that is two hops downstream therefrom, and the mobile station that is one hop upstream therefrom (T1602). When the relay station 2 receives ACK from the relay station 1 (T1602), the relay station 2 determines that the relay station 1 can relay the signal.

The relay station 2 transmits the relay signal with the same MCS used by the relay station 1 to relay signals to the base station that is three hops downstream therefrom and at the same transmission timing as the relay station 1 relays signals to the base station (T1603). The relay station 3 also receives ACK from the relay station 1 (T1602). The base station receives the signal from the relay station 1 and the signal from the relay station 2 at the same time (T1603). Therefore, it is possible to obtain a transmission diversity effect.

When receiving ACK from the relay station 1 (T1602), the relay station 3 receives the relay signal from the relay station 1 (T1603). However, since the relay station 3 is adjacent to the base station, the relay station 3 determines whether the base station transmits ACK/NACK and then transmits ACK or NACK. When succeeding in receiving the relay signal (T1603: OK), the base station transmits ACK to the relay station 3 that is one hop upstream therefrom and the relay station 2 that is two hops upstream therefrom (T1604).

As such, in the pattern 1, it is possible to improve the reception quality of signals by the relay station 3 and the base station by the transmission diversity effect of the relay station 1 and the relay station 2.

(Pattern 2)

Figure 17:
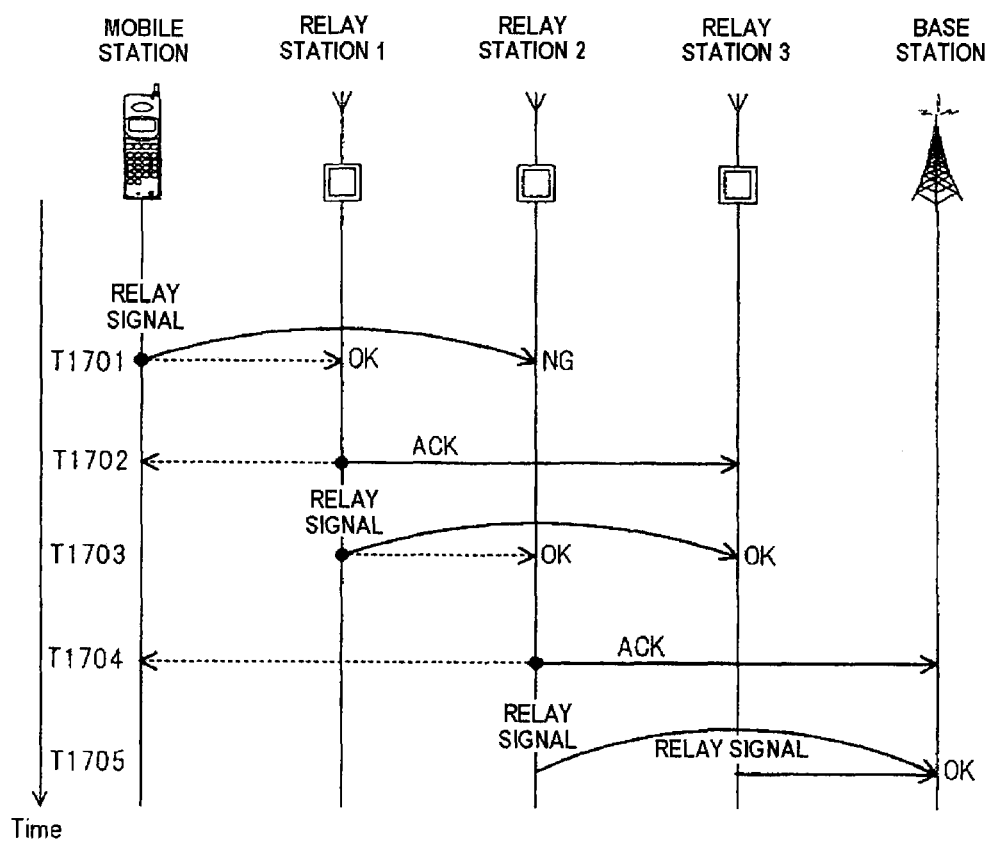
FIG. 17 illustrates an operation example (pattern 2) of the radio communication method according to the third embodiment of the invention.

FIG. 17 shows an operation example (pattern 2). The pattern 2 is a case in which, when the mobile station transmits a signal, the relay station 1 succeeds in receiving the signal and the relay station 2 fails in receiving the signal (T1701). Since the relay station 1 succeeds in receiving the signal similar to the pattern 1, the relay station 1 transmits ACK to the relay station 2 that is one hop downstream therefrom, the relay station 3 that is two hops downstream therefrom, and the mobile station that is one hop upstream therefrom (T1702). Since the relay station 2 fails in receiving the signal, it does not participate in cooperative relay.

The relay station 1 transmits a signal with the MCS set for transmission from the relay station 1 to the relay station 3 (T1703). The relay station 2 receives the signal relayed by the relay station 1 (T1703). When succeeding in receiving the signal, the relay station 2 transmits ACK to the relay station 3 that is one hop downstream therefrom, the base station that is two hops downstream therefrom, the relay station 1 that is one hop upstream therefrom, and the mobile station that is two hops upstream therefrom (T1704).

When receiving ACK (T1704), the relay station 3 transmits the relay signal with the same MCS used by the relay station 2, which is one hop upstream therefrom, to transmit the relay signal and at the same transmission timing as the relay station 2 transmits the relay signal, similar to the operation of the relay station 2 in the pattern 1 (T1705). The base station receives the signals from the relay station 2 and the relay station 3 (T1705). Therefore, a diversity effect is obtained.

As such, in the pattern 2, instead of the mobile station, the relay station 1 relays the signal that failed to be received by the relay station 2 to the relay station 3. Therefore, it is possible to relay a signal to the relay station that is one hop downstream during retransmission.

(Pattern 3)

Figure 18:
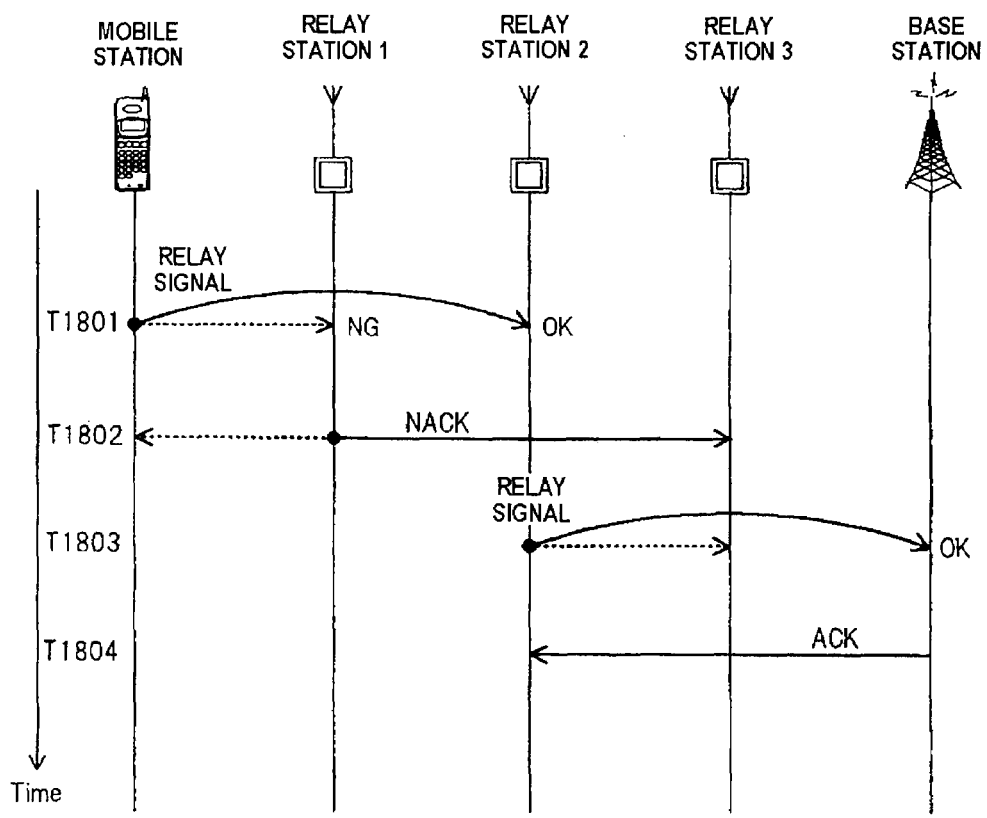
FIG. 18 illustrates an operation example (pattern 3) of the radio communication method according to the third embodiment of the invention.

FIG. 18 shows an operation example (pattern 3). The pattern 3 is a case in which, when the mobile station transmits a signal, the relay station 1 fails in receiving the signal and the relay station 2 succeeds in receiving the signal (T1801). Since the relay station 1 fails in receiving the signal, the relay station 1 transmits NACK to the relay station 2 that is one hop downstream therefrom, the relay station 3 that is two hops downstream therefrom, and the mobile station that is one hop upstream therefrom (T1802). When receiving NACK (T1802), the relay station 2 determines that the relay station 1 does not transmit the relay signal.

The relay station 2 sets an MCS for transmitting the signal to the base station and transmits the relay signal with the set MCS (T1803). In this case, the relay station 3 receives the relay signal transmitted from the relay station 2 (T1803). When succeeding in receiving the signal transmitted from the relay station 2 (T1803: OK), the base station transmits ACK to the relay station 3 that is one hop upstream therefrom and the relay station 2 that is two hops upstream therefrom (T1804).

As such, in the pattern 3, even when the relay station 1 fails in receiving the signal, it is possible to transmit the relay signal to the base station since the relay station 2 succeeds in receiving the signal. Even when the relay station 1 fails in receiving the signal, the mobile station does not need to retransmit the relay signal since the relay station 1 does not transmit a retransmission request (NACK).

(Pattern 4)

Figure 19:
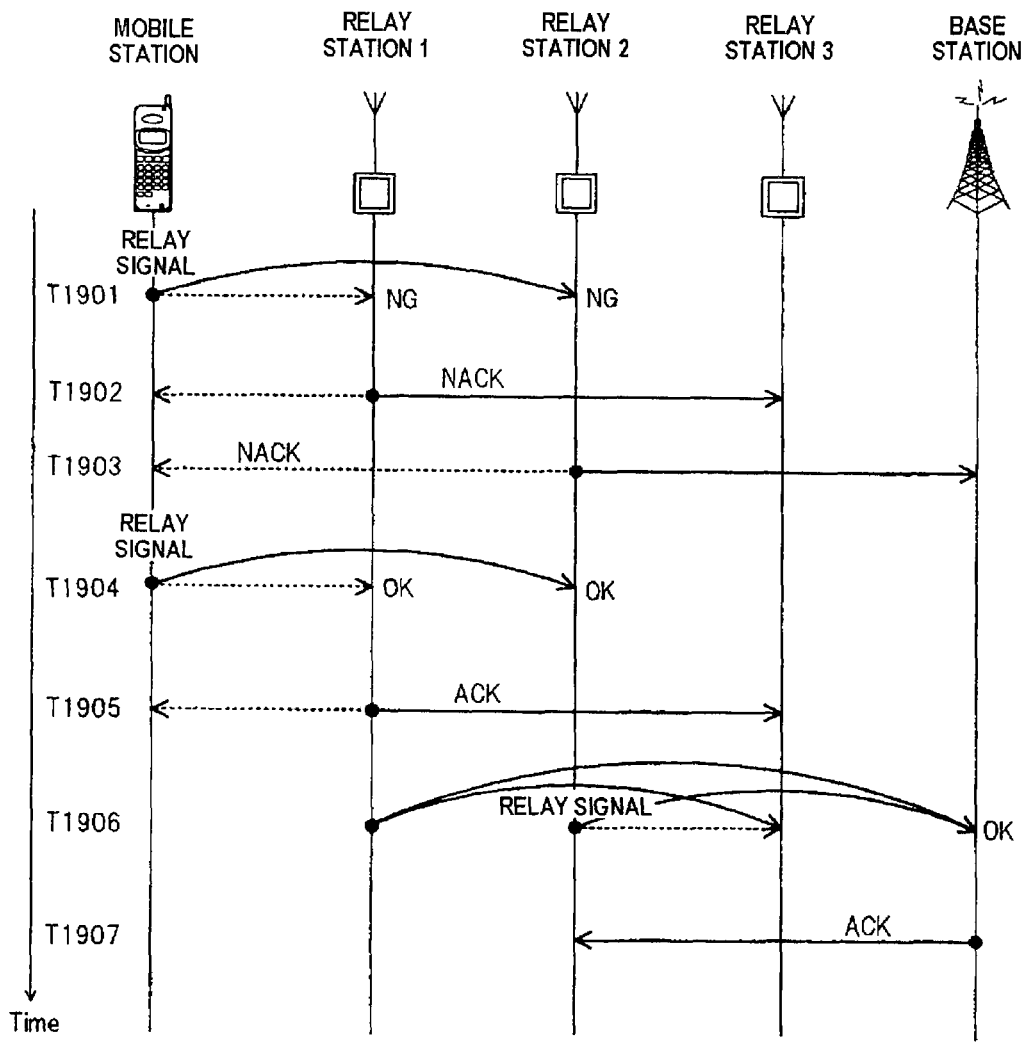
FIG. 19 illustrates an operation example (pattern 4) of the radio communication method according to the third embodiment of the invention.

FIG. 19 shows an operation example (pattern 4). The pattern 4 is a case in which, when the mobile station transmits a signal, both the relay station 1 and the relay station 2 fail in receiving the signal (T1901). Since the relay station 1 fails in receiving the signal, the relay station 1 transmits NACK to the relay station 2 that is one hop downstream therefrom, the relay station 3 that is two hops downstream therefrom, and the mobile station that is one hop upstream therefrom (T1902). Since both the relay station 1 and the relay station 2 fail in receiving the signal, the relay station 2 transmits NACK to the relay station 1 that is one hop upstream therefrom, the mobile station that is two hops upstream therefrom, the relay station 3 that is one hop downstream therefrom, and the base station that is two hops downstream therefrom (T1903).

When receiving NACK from the relay station 2 (T1903), the mobile station retransmits the relay signal (T1904). In this case, the mobile station sets the MCS used by the mobile station to transmit signals to the relay station 2 and relays a signal using the set MCS (T1904). After receiving NACK from the relay station 1 and the relay station 2 (T1902), the relay station 3 predicts the retransmission of the relay signal by the mobile station.

The relay station 1 and the relay station 2 receive retransmission signals from the mobile station (T1904). After this operation, the operations of the patterns 1 to 4 are performed according to whether the relay station 1 and the relay station 2 succeed in receiving the retransmission signals. FIG. 19 shows an example of the pattern 1 (T1905 to T1907).

Figure 20:
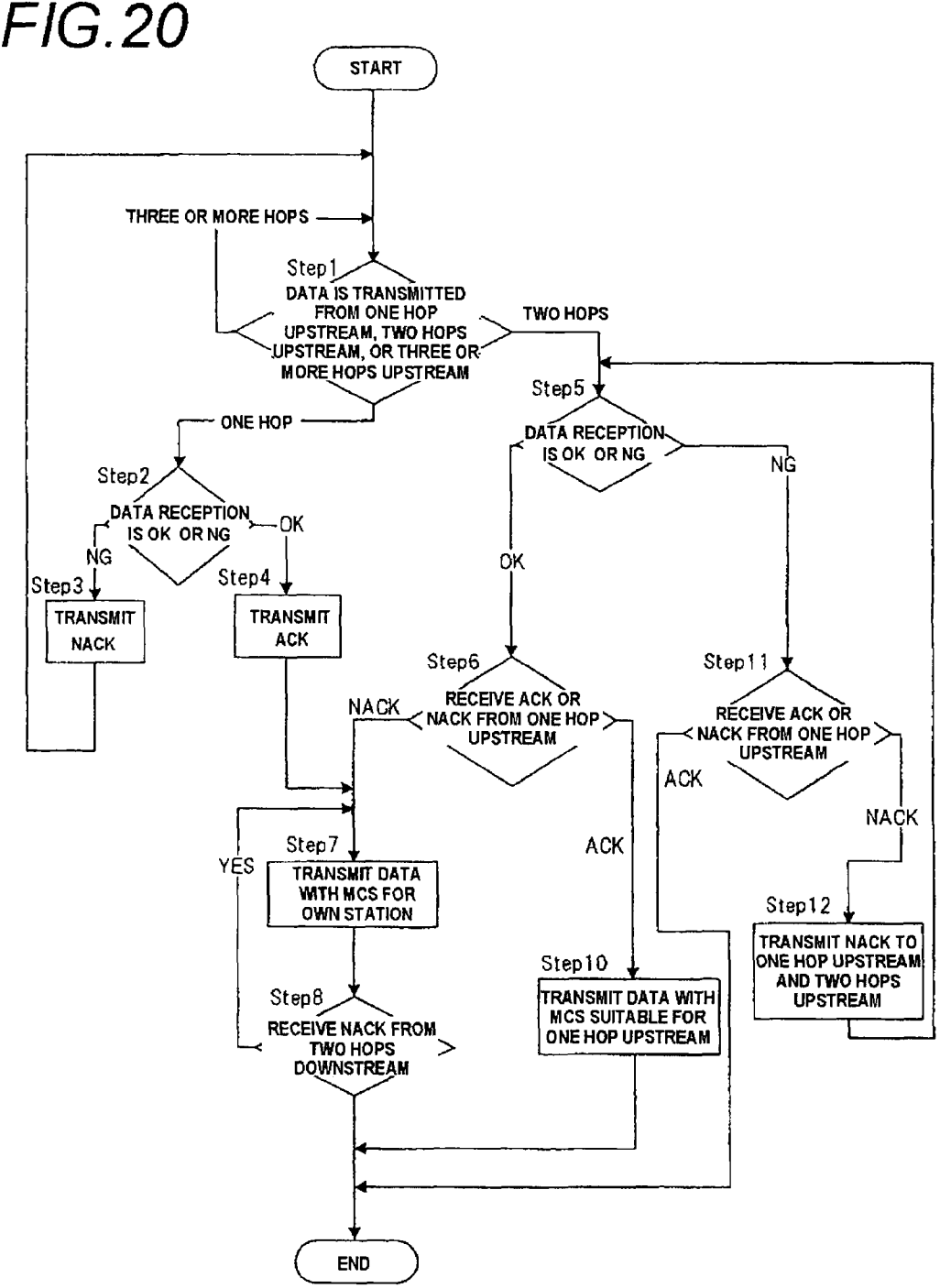
FIG. 20 is a flowchart illustrating the operation of a transmission determining unit according to the third embodiment of the invention.

A block diagram illustrating the structure of a relay station device is the same as that of FIG. 7, but is different from that of FIG. 7 in the operation of the transmission determining unit. FIG. 20 is a flowchart illustrating the operation of the transmission determining unit according to this embodiment. A description of the same portions as those in the flowchart according to Embodiment 1 (FIG. 8) will be omitted.

In [Step 1], the transmission determining unit 16 determines the number of hops away from a transmission source terminal to the upstream side on the basis of the address of the transmission source, transmission timing, or a frequency. When the terminal (the relay station or the mobile station) that transmits data is three or more hops upstream from the relay station including the transmission determining unit 16, the transmission determining unit 16 returns to Step 1. When the terminal is one hop upstream from the relay station, the transmission determining unit 16 proceeds to Step 2. When the terminal is two hops upstream from the relay station, the transmission determining unit 16 proceeds to Step 5.

In [Step 6], when receiving ACK from the base station or the relay station that is one hop upstream, the transmission determining unit 16 proceeds to Step 10. When receiving NACK from the base station or the relay station, the transmission determining unit 16 proceeds to Step 7.

In [Step 8], when receiving NACK from the relay station that is two hops downstream, the transmission determining unit 16 proceeds to Step 7. When not receiving NACK, the transmission determining unit 16 ends its operation.

In [Step 10], the transmission determining unit 16 determines to transmit the relay signal with the same MCS used by the relay station that is one hop upstream to transmit the relay signal and ends its operation.

In [Step 11], when receiving ACK from the relay station that is one hop upstream, the transmission determining unit 16 ends its operation. When receiving NACK from the relay station, the transmission determining unit 16 proceeds to Step 12.

In [Step 12], the transmission determining unit 16 determines to transmit NACK to the relay station that is one hop upstream and the relay station that is two hops upstream and proceeds to Step 5.

As such, in this embodiment, it is possible to perform cooperative relay with an MCS suitable for the upstream relay station.

Embodiment 4

In this embodiment, when the downstream relay station 2 can receive a signal from the mobile station without any error, the relay station 2 sets its own MCS and independently relays the signal using the set MCS. When there is an error in the received signal, the relay station 2 notifies the SNR (Signal to Noise Ratio) of the relay signal to the upstream relay station 1. When the SNR of the relay station 2 is high, the relay station 1 and the relay station 2 perform cooperative relay with the same MCS as that of the signal received from the mobile station. On the other hand, when the SNR of the relay station 2 is low, the relay station 1 independently relays the signal.

As such, in this embodiment, even when there is an error in the relay signal, the downstream relay station can participate in cooperative relay when the SNR of the relay signal is high. Therefore, it is possible to obtain a diversity effect.

The relay methods from the mobile station to the relay station when the relay station 1 succeeds in receiving a signal (OK) are classified into three patterns, which are shown in the following Table 3. Each of the patterns will be described using an operation example.

TABLE 3

| | Transmission pattern | | | |
|---|---|---|---|---|
| | Relay station that is one hop downstream (relay station 1) | Relay station that is two hops downstream (relay station 2) | Operation of relay station 1 or relay station 2 | |
| Pattern 1 | OK | OK | Relay station 1 intercepts signal of relay station 2 and uses it instead of ACK | Relay station 2 independently relay signals |
| Pattern 2 | OK | NG HIGH SNR | Relay station 1 transmits signals | Relay station 1 and Relay station 2 perform cooperative relay |
| Pattern 3 | OK | NG LOW SNR | Relay station 2 transmits signals | Relay station 1 independently relay signals |

(Pattern 1)

Figure 21:
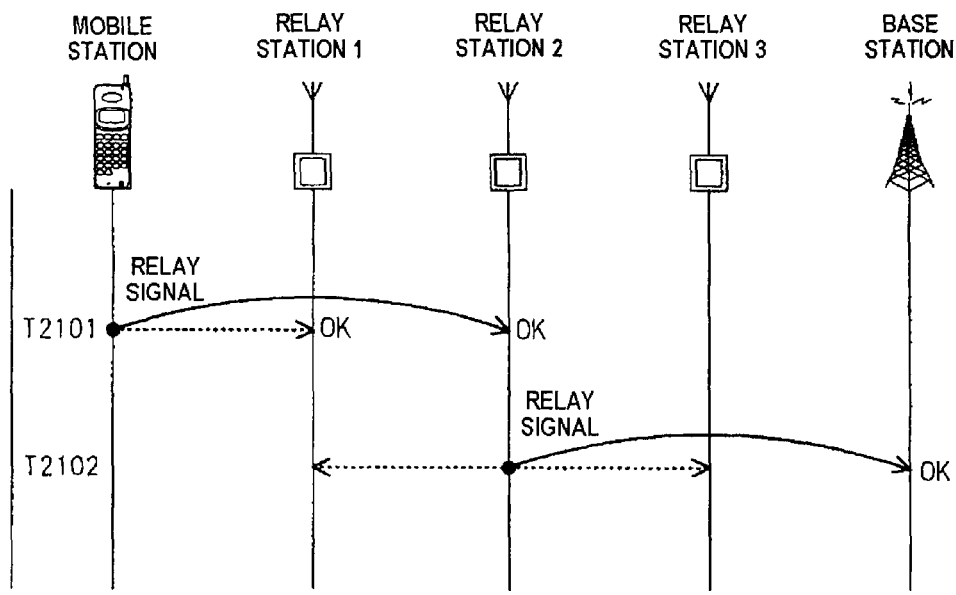
FIG. 21 illustrates an operation example (pattern 1) of a radio communication method according to a fourth embodiment of the invention.

FIG. 21 shows an operation example (pattern 1). The pattern 1 is a case in which, when the mobile station transmits a signal, both the relay station 1 and the relay station 2 succeed in receiving the signal (T2101). The relay station 2 sets an MCS for transmission from the relay station 2 to the base station that is two hops downstream therefrom and transmits a relay signal using the set MCS (T2102). When receiving the relay signal transmitted from the mobile station, the relay station 1 determines that the relay station succeeds in receiving the signal and stops the relay operation.

(Pattern 2)

Figure 22:
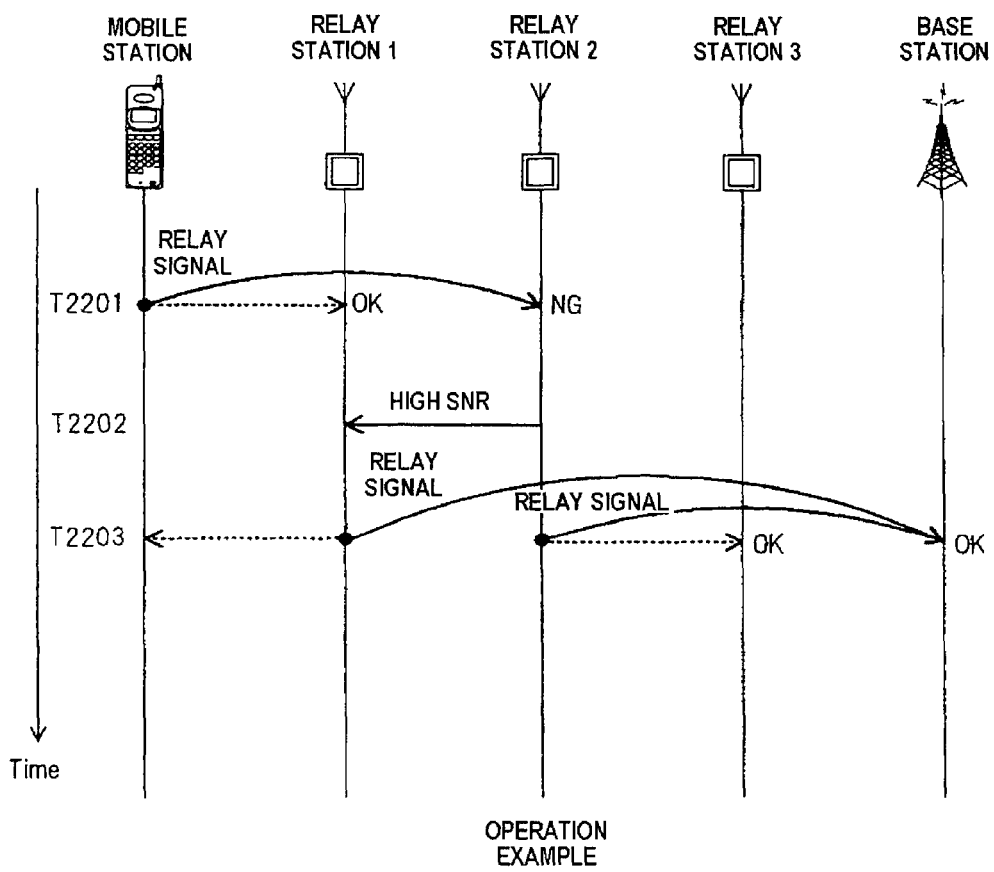
FIG. 22 illustrates an operation example (pattern 2) of the radio communication method according to the fourth embodiment of the invention.

FIG. 22 shows an operation example (pattern 2). The pattern 2 is a case in which the relay station 1 succeeds in receiving a signal and the relay station 2 fails in receiving a signal (T2201). The relay station 2 performs error determination (CRC). When the determination result is "NG", the relay station 2 determines that the relay signal includes an error. When it is determined that there is an error, the relay station 2 compares the SNR of the received relay signal with a predetermined threshold value to determine whether the SNR is high. In this pattern, since the SNR is high, the relay station 2 notifies the relay station 1 that the SNR is high (T2202).

When receiving a signal indicating that the SNR of the relay station 2 is high (T2202), the relay station 1 transmits the relay signal to the base station using the same MCS as that for the relay signal received from the mobile station (T2203). The relay station 2 transmits the received relay signal including an error using the same MCS as that used to receive the relay signal (T2203).

(Pattern 3)

Figure 23:
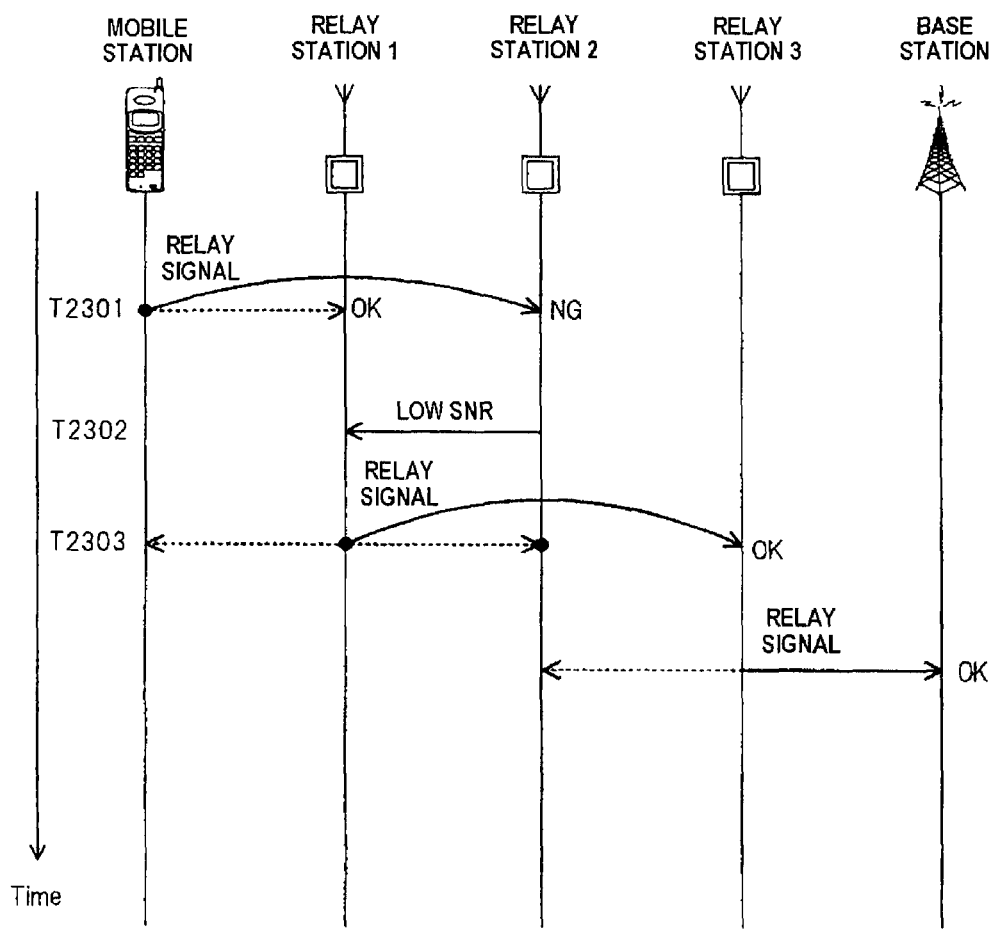
FIG. 23 illustrates an operation example (pattern 3) of the radio communication method according to the fourth embodiment of the invention.

FIG. 23 shows an operation example (pattern 3). The pattern 3 is a case in which the relay station 1 succeeds in receiving a signal and the relay station 2 fails in receiving a signal (T2301), similar to the pattern 2. In this pattern, the SNR of the relay station received by the relay station 2 is low. The relay station 2 notifies the relay station 1 that the SNR of the relay signal is low (T2302).

When receiving a signal indicating that the SNR of the relay station 2 is low (T2302), the relay station 1 transmits the relay signal using the MCS used by the relay station 1 to transmit the relay signal to the relay station 3 that is two hops downstream therefrom (T2303). The relay station 3 transmits the relay signal to the base station (T2304).

Figure 24:
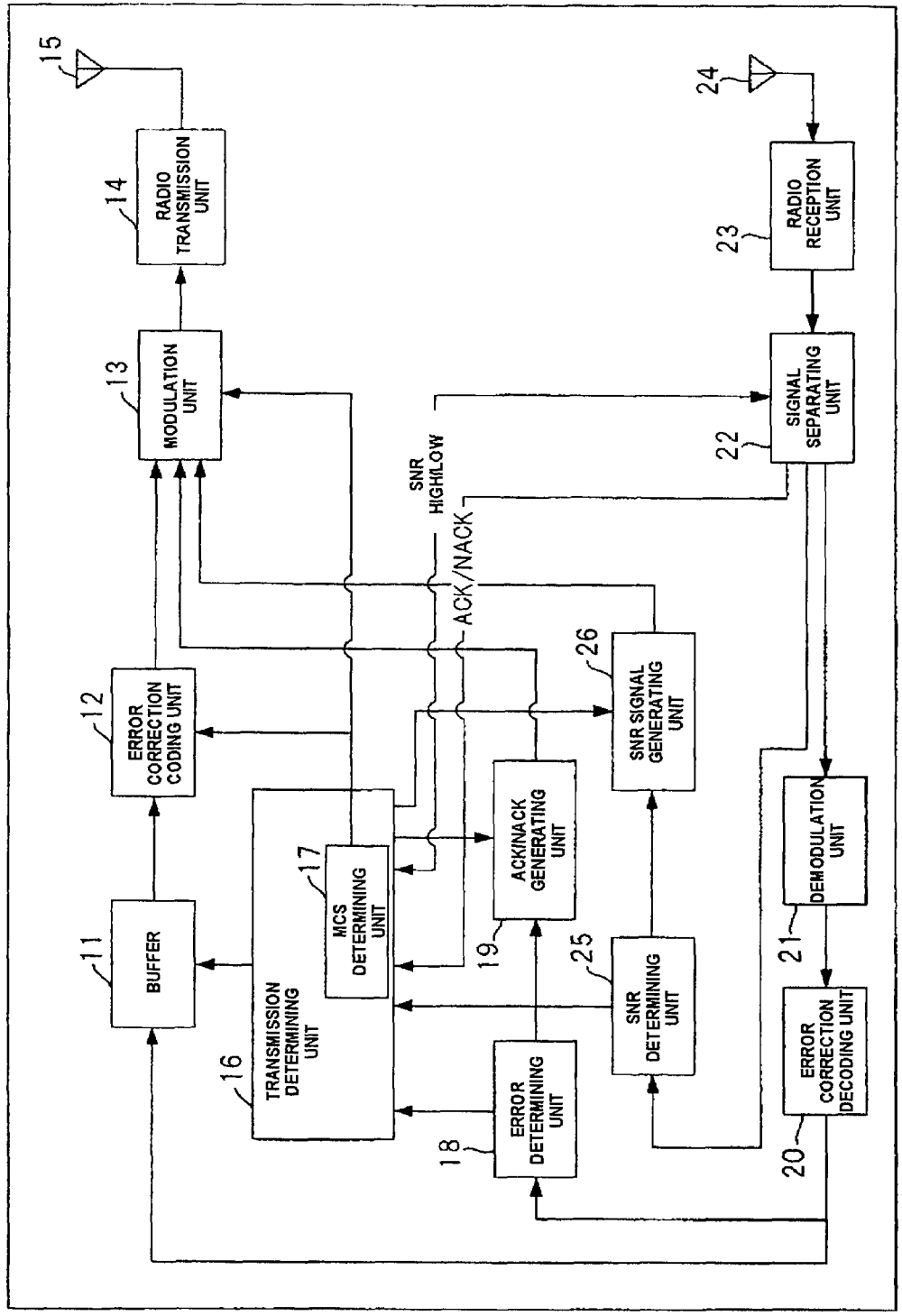
FIG. 24 is a block diagram illustrating the structure of a relay station device according to the fourth embodiment of the invention.

[Block diagram of relay station] FIG. 24 is a block diagram illustrating the structure of a relay station device according to this embodiment. The relay station device shown in FIG. 24 includes an SNR determining unit 25 and an SNR signal generating unit 26 in addition to the components of the relay station device according to Embodiment 1 shown in FIG. 7 and differs therefrom the operation of the transmission determining unit 16. Hereinafter, only components different from those according to Embodiment 1 will be described.

The transmission determining unit 16 according to this embodiment determines whether to transmit the relay signal, ACK/NACK, and the SNR signal and instructs the buffer 11, the ACK/NACK generating unit 19, and the SNR signal generating unit 26 to transmit the signals. The signal separating unit 2 separates the signal output from the radio reception unit 23 into a relay signal, an ACK/NACK signal, and a signal indicating a high/low SNR. The received signal is output to the demodulation unit 21 and the SNR determining unit 25. The signal indicating a high/low SNR is output to the transmission determining unit 16.

The SNR determining unit 25 measures the SNR of the relay signal separated by the signal separating unit 22 and compares the measured SNR with a predetermined threshold value to determine whether the measured SNR is equal to or greater than the threshold value. The SNR determining unit 25 outputs the determination result to the transmission determining unit 16 and the SNR signal generating unit 26.

The SNR signal generating unit 26 generates a signal indicating a high SNR or a low SNR on the basis of the determination result of the SNR determining unit 25. In addition, the SNR signal generating unit 26 outputs the signal to the modulation unit 13 when there is an output instruction from the transmission determining unit 16.

Figure 25:
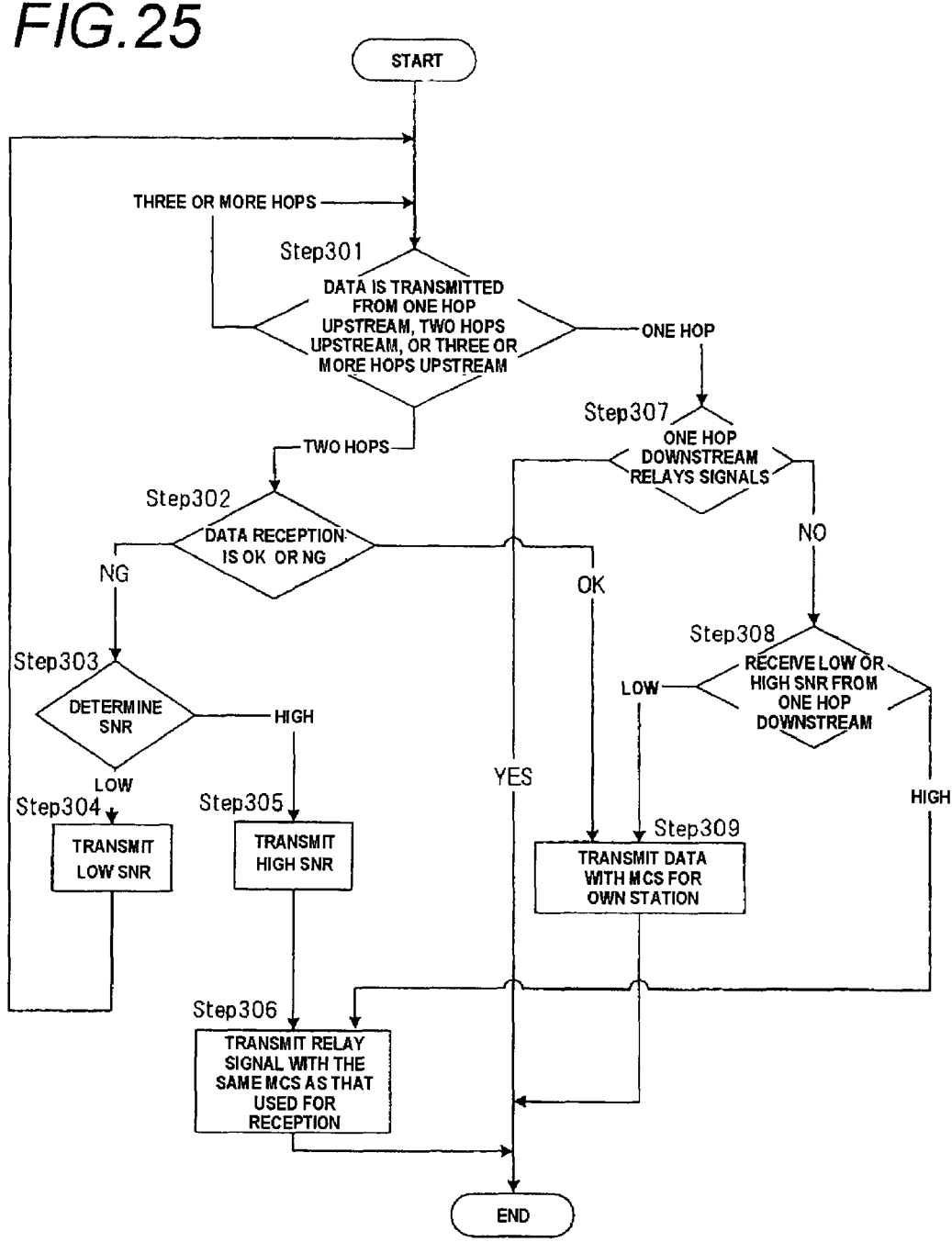
FIG. 25 is a flowchart illustrating the operation of a transmission determining unit, an SNR determining unit, and an SNR signal generating unit according to the fourth embodiment of the invention.

FIG. 25 is a flowchart (Embodiment 4) illustrating the operation of the transmission determining unit 16, the SNR determining unit 25, and the SNR signal generating unit 26 in the relay station device. In [Step 301], the transmission determining unit 16 determines the number of hops away from a transmission source terminal to the upstream side on the basis of the address of the transmission source, transmission timing, or a frequency. When the terminal (the relay station or the mobile station) that transmits data is three or more hops upstream from the relay station including the transmission determining unit 16, the transmission determining unit 16 returns to Step 301. When the terminal is two hops upstream from the relay station, the transmission determining unit 16 proceeds to Step 302. When the terminal is one hop upstream from the relay station, the transmission determining unit 16 proceeds to Step 307.

In [Step 302], the transmission determining unit 16 proceeds to Step 309 when succeeding in receiving data, and proceeds to Step 303 when failing in receiving data, on the basis of the output from the error determining unit 18. In [Step 303], the SNR determining unit 25 compares the SNR of the relay signal with a predetermined threshold value. When the SNR of the relay signal is equal to or greater than the threshold value, the SNR determining unit 25 determines that the SNR is high and proceeds to Step 305. When the SNR of the relay signal is less than the threshold value, the SNR determining unit 25 determines that the SNR is low and proceeds to Step 304.

In [Step 304], the SNR signal generating unit 26 generates a signal indicating a "low SNR" and proceeds to Step 301. In [Step 305], the SNR signal generating unit 26 generates a signal indicating a "high SNR" and proceeds to Step 306. The SNR signal generating unit 26 outputs the signal to the modulation unit 13 when there is an output instruction from the transmission determining unit 16. Then, in [Step 306], the transmission determining unit 16 determines to transmit the relay signal with the same MCS used for the received relay signal and ends its operation.

In [Step 307], the transmission determining unit 16 ends its operation when measuring the reception power of a resource allocated with the relay signal to detect that the relay signal is transmitted from the relay station that is one hop downstream, and proceeds to Step 308 when it is difficult to detect the relay signal. In [Step 308], the transmission determining unit 16 proceeds to Step 309 when receiving the signal indicating a low SNR from the relay station that is one hop downstream. In [Step 308], the transmission determining unit 16 proceeds to Step 306 when receiving the signal indicating a high SNR from the relay station that is one hop downstream. In [Step 309], the transmission determining unit 16 determines to transmit the relay signal with MCS for the relay station including transmission determining unit 16 and ends its operation.

In this embodiment, it is assumed that the relay station 1 succeeds in receiving a signal. However, when the relay station 1 fails in receiving a signal and receives the signal indicating a low SNR from the relay station 2, the relay station 1 transmits NACK to the mobile station and the mobile station retransmits the signal. When the relay station receives the signal indicating a high SNR from the relay station 2, the relay station 1 may also relay a signal including an error.

In the pattern 1, the relay station 2 independently relays signals to the base station. However, as in Embodiment 1, the relay station 2 may transmit ACK and the relay station 1 and the relay station 2 may perform cooperative relay.

SIR, SINR, CIR, CNR, CINR, RSSI, reception power, interference power, an error ratio, a transmission rate, and throughput may be used as quality information, instead of SNR.

Embodiment 5

In this embodiment, a relay station 1 and a relay station 2 receiving a relay signal from a mobile station relay the relay signal at different timings. The relay station 2 receives the relay signal. When succeeding in receiving the relay signal, the relay station 2 transmits ACK. Thereafter, the relay station 2 transmits the relay signal. When receiving ACK from the relay station 2, the relay station 1 transmits the relay signal at a timing different from that of the relay station 2.

According to this structure, the relay signal transmitted by the relay station 1 does not interfere with the relay signal transmitted by the relay station 2. Therefore, each of the relay station 1 and the relay station 2 can set the relay signal to a modulation multi-value number suitable for relay.

In this embodiment, since the relay station 1 and the relay station 2 transmit the relay signals at different timings, they may not transmit the same symbol. In this embodiment, the relay station 2 transmits a signal for initially transmitting HARQ (Hybrid Automatic Repeat reQuest) and the relay station 1 transmits a retransmission signal of the signal transmitted by the relay station 2. Specifically, the relay station 1 and the relay station 2 store signals subjected to the same error correction coding in the buffer, the relay station 1 transmits signals from the head of the buffer to a predetermined position, and the relay station 2 transmits signals after the predetermined position.

According to this structure, since the relay station 1 and the relay station 2 transmit signals including different parity bits, it is possible to improve the error correction effect of the receiver side.

TABLE 4

| | Transmission pattern | | |
|---|---|---|---|
| | Relay station that is one hop downstream (relay station 1) | Relay station that is two hops downstream (relay station 2) | |
| Pattern 1 | OK | OK | Relay station 2 initially transmits signals Relay station 1 transmits retransmission signals at timing different from that of relay station 2 |
| Pattern 2 | OK | NG | Relay station 1 transmits signals |
| Pattern 3 | NG | OK | Relay station 2 transmits signals |
| Pattern 4 | NG | NG | Relay station 1 transmits retransmission request to mobile station |

(Pattern 1)

Figure 26:
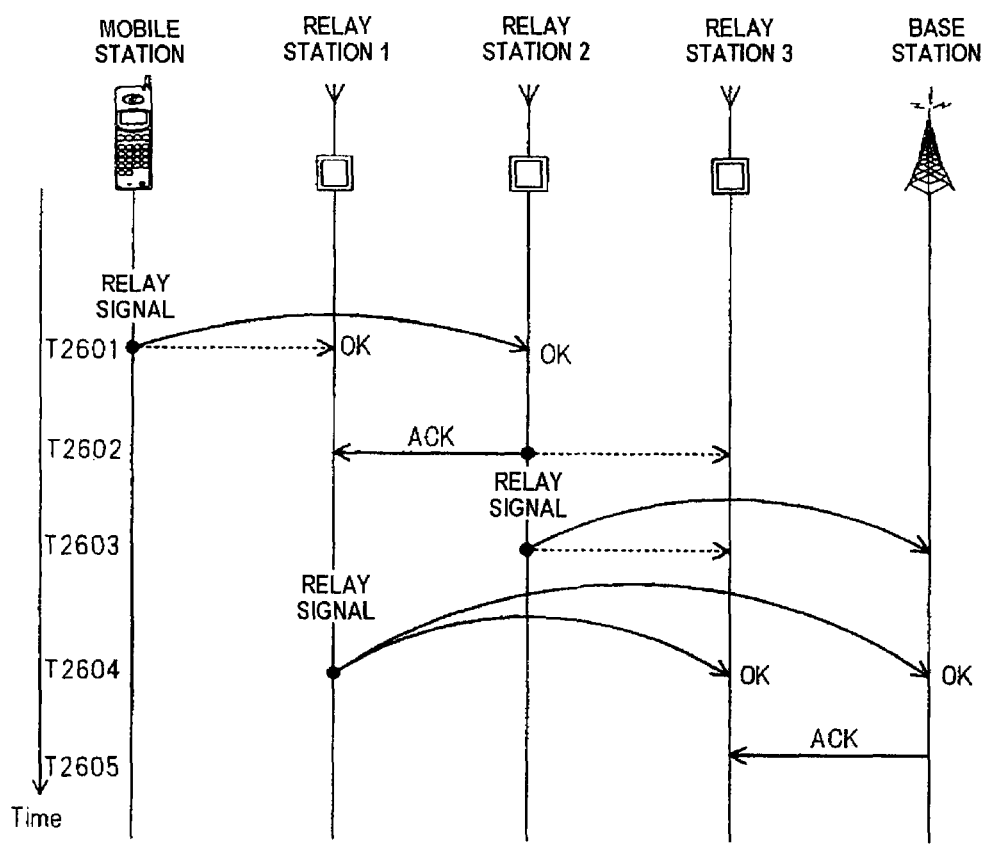
FIG. 26 illustrates an operation example (pattern 1) of a radio communication method according to a fifth embodiment of the invention.

FIG. 26 shows an operation example (pattern 1). The pattern 1 is a case in which, when the mobile station transmits a signal, both the relay station 1 and the relay station 2 succeed in receiving the signal (T2601). Since the relay station 2 succeeds in receiving the signal, it transmits ACK to the relay station 1 that is one hop upstream therefrom (T2602). When receiving ACK from the relay station 2 (T2602), the relay station 1 determines that the relay station 2 can relay the signal.

The relay station 2 transmits a relay signal for initially transmitting HARQ to the base station (T2603). The relay station 1 generates a signal which will be a retransmission signal of the signal relayed from the relay station 2 to the base station that is two hops downstream. Since the signal includes a parity bit that is not transmitted by the relay station 2, it is possible to improve the error correction effect of the receiver side. The relay station 1 transmits the generated relay signal at a timing different from that of the relay station 2 (T2604).

Since the base station receives the signal transmitted from the relay station 1 and the signal transmitted from the relay station 2, a transmission diversity effect is obtained.

When receiving ACK from the relay station 2 (T2602), the relay station 3 determines that the destination of the relay signal to be subsequently transmitted by the relay station 2 is the base station, similar to Embodiment 1. Then, the relay station 3 receives the relay signal transmitted by the relay station 2 (T2604), but does not transmit ACK/NACK. When succeeding in receiving the relay signal, the base station transmits ACK to the relay station 3 that is one hop upstream therefrom (T2605). When receiving ACK from the base station, which is the final destination, the relay station 3 does not transmit the relay signal.

As such, in the pattern 1, since the relay station 1 and the relay station 2 transmit different relay signals, it is possible to improve a transmission diversity effect. Therefore, it is possible to improve the reception quality of signals by the relay station 3 and the base station.

(Pattern 2)

Figure 27:
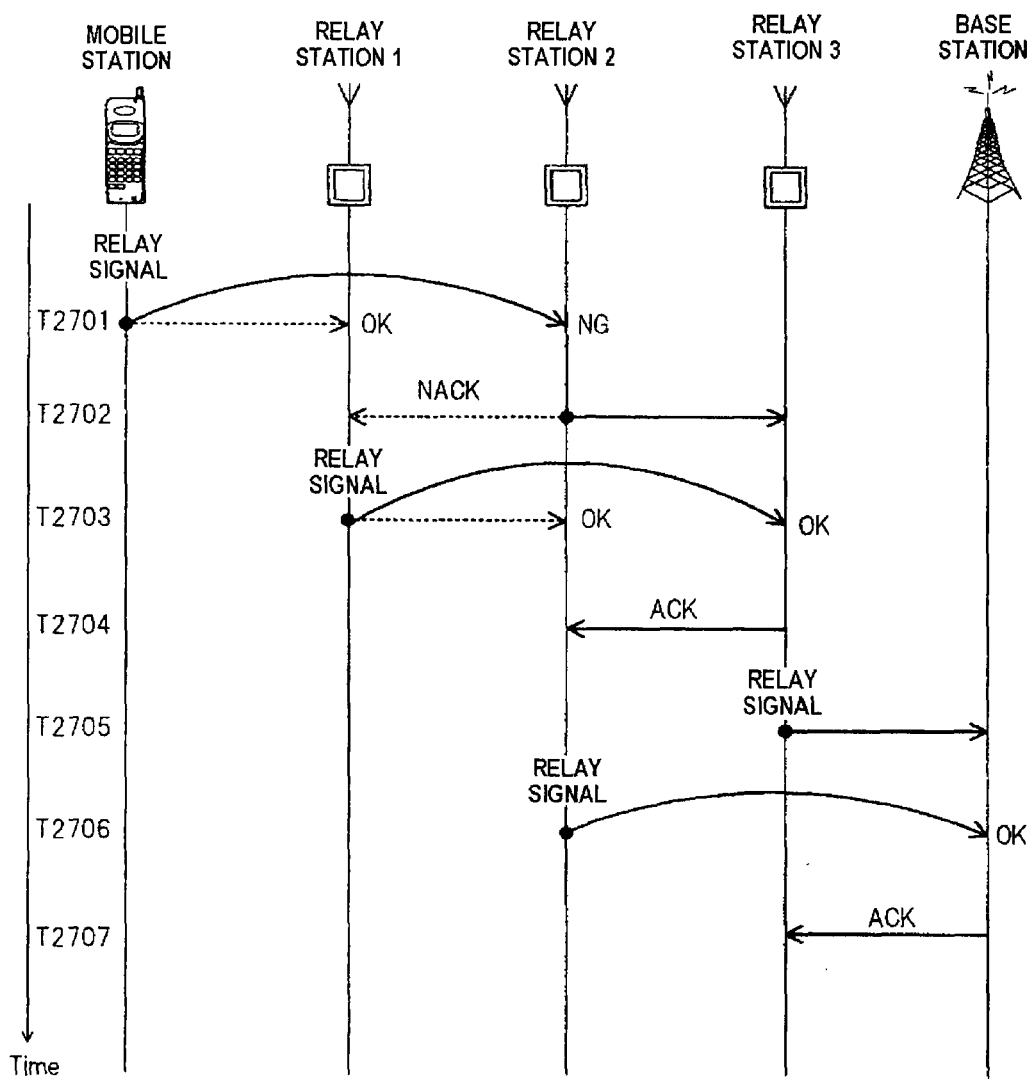
FIG. 27 illustrates an operation example (pattern 2) of the radio communication method according to the fifth embodiment of the invention.

FIG. 27 shows an operation example (pattern 2). The pattern 2 is a case in which, when the mobile station transmits a signal, the relay station 1 succeeds in receiving the signal but the relay station 2 fails in receiving the signal (T2701). Since the relay station 2 fails in receiving the signal, it transmits NACK to the relay station 1 that is one hop upstream therefrom (T2702). When the relay station 2 receives NACK (T2702), the relay station 1 determines that the relay station 2 cannot relay the signal.

The relay station 1 transmits an initial signal of HARQ that has been predicted to be transmitted by the relay station 2 (T2703). In this case, the modulation multi-value number determined for transmission from the relay station 1 to the relay station 3 is used.

The relay station 3 also receives NACK transmitted by the relay station 2 (T2702) and predicts that the relay station 1 transmits the relay signal to the relay station 3.

The relay station 3 receives the signal transmitted by the relay station 1 (T2703). When succeeding in receiving the signal, the relay station 3 transmits ACK to the relay station 2 that is one hop upstream therefrom (T2704). The relay station 3 transmits an initial transmission signal of HARQ to the base station (T2705). When receiving ACK (T2704), the relay station 2 transmits a retransmission signal of HARQ at a timing different from that of the relay station 3, similar to the operation of the relay station 1 in the pattern 1 (T2706). The base station receives the signals from the relay station 2 and the relay station 3, and a diversity effect is obtained (T2705 and T2706). When succeeding in receiving the signal, the base station transmits ACK to the relay station 3 that is one hop upstream therefrom (T2707).

As such, in the pattern 2, instead of the mobile station, the relay station 1 relays the signal that failed to be received by the relay station 2 to the relay station 3. Therefore, it is possible to relay a signal to the relay station that is one hop downstream during retransmission.

(Pattern 3)

Figure 28:
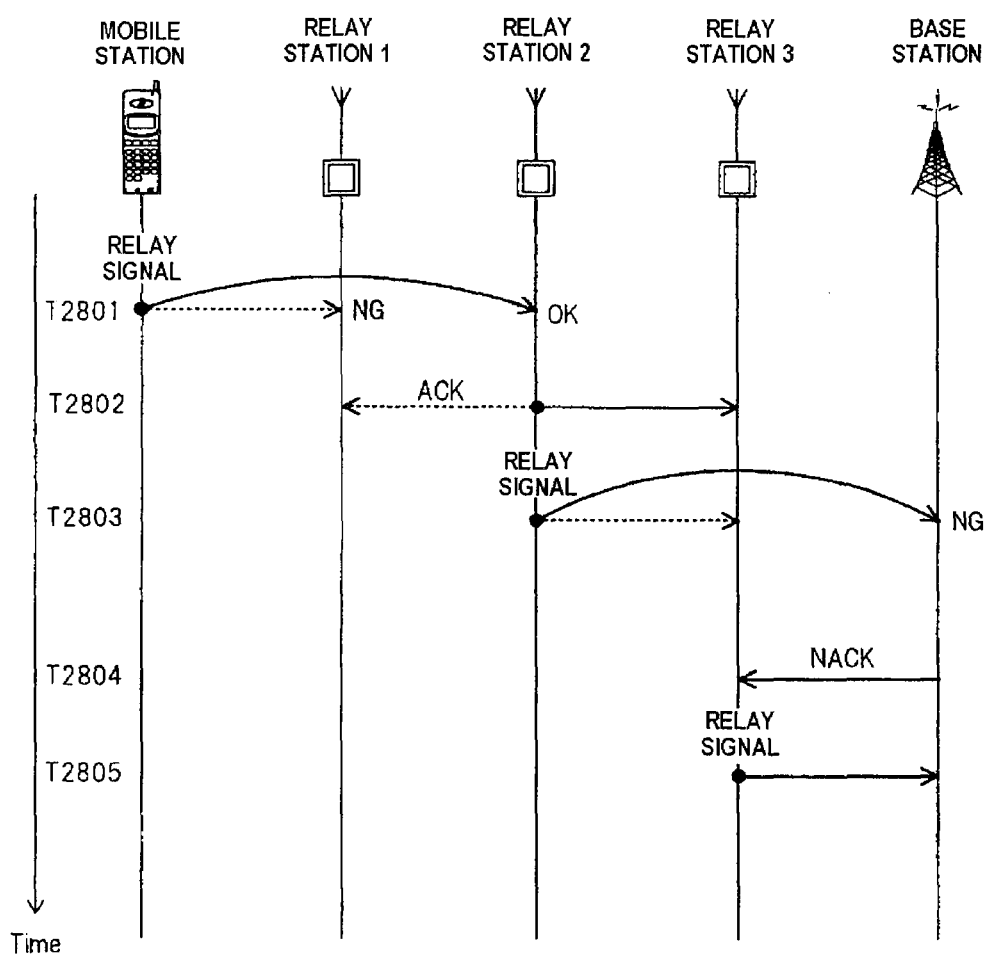
FIG. 28 illustrates an operation example (pattern 3) of the radio communication method according to the fifth embodiment of the invention.

FIG. 28 shows an operation example (pattern 3). The pattern 3 is a case in which, when the mobile station transmits a signal, the relay station 1 fails in receiving the signal, but the relay station 2 succeeds in receiving the signal (T2801). Since the relay station 2 succeeds in receiving the signal (T2801), it transmits ACK to the relay station 1 that is one hop upstream therefrom (T2802). When receiving ACK (T2802), the relay station 1 determines that the relay station 2 transmits the relay signal, and does not transmit NACK to the mobile station even though it fails in receiving the signal.

The relay station 2 sets an MCS for transmitting the relay signal to the base station and transmits the initial signal of HARQ (T2803). In this case, the relay station 3 receives the relay signal transmitted by the relay station 2 (T2803). After receiving the signal transmitted by the relay station 2, the base station receives a signal from the relay station 1. However, since the relay station 2 does not transmit a retransmission signal, the time is out and only the signal transmitted from the relay station 2 is subjected to error correction decoding. When failing in receiving the signal, the base station transmits NACK to the relay station 3 that is one hop upstream therefrom (T2804). When receiving NACK, the relay station 3 generates a retransmission signal of HARQ and transmits the generated signal to the base station (T2805).

As such, in the pattern 3, even when the relay station 1 fails in receiving the signal, it is possible to transmit the relay signal to the base station since the relay station 2 succeeds in receiving the signal. In addition, even when the relay station 1 fails in receiving the signal, the mobile station does not need to retransmit the relay signal since the relay station 1 does not transmit a retransmission request (NACK).

(Pattern 4)

Figure 29:
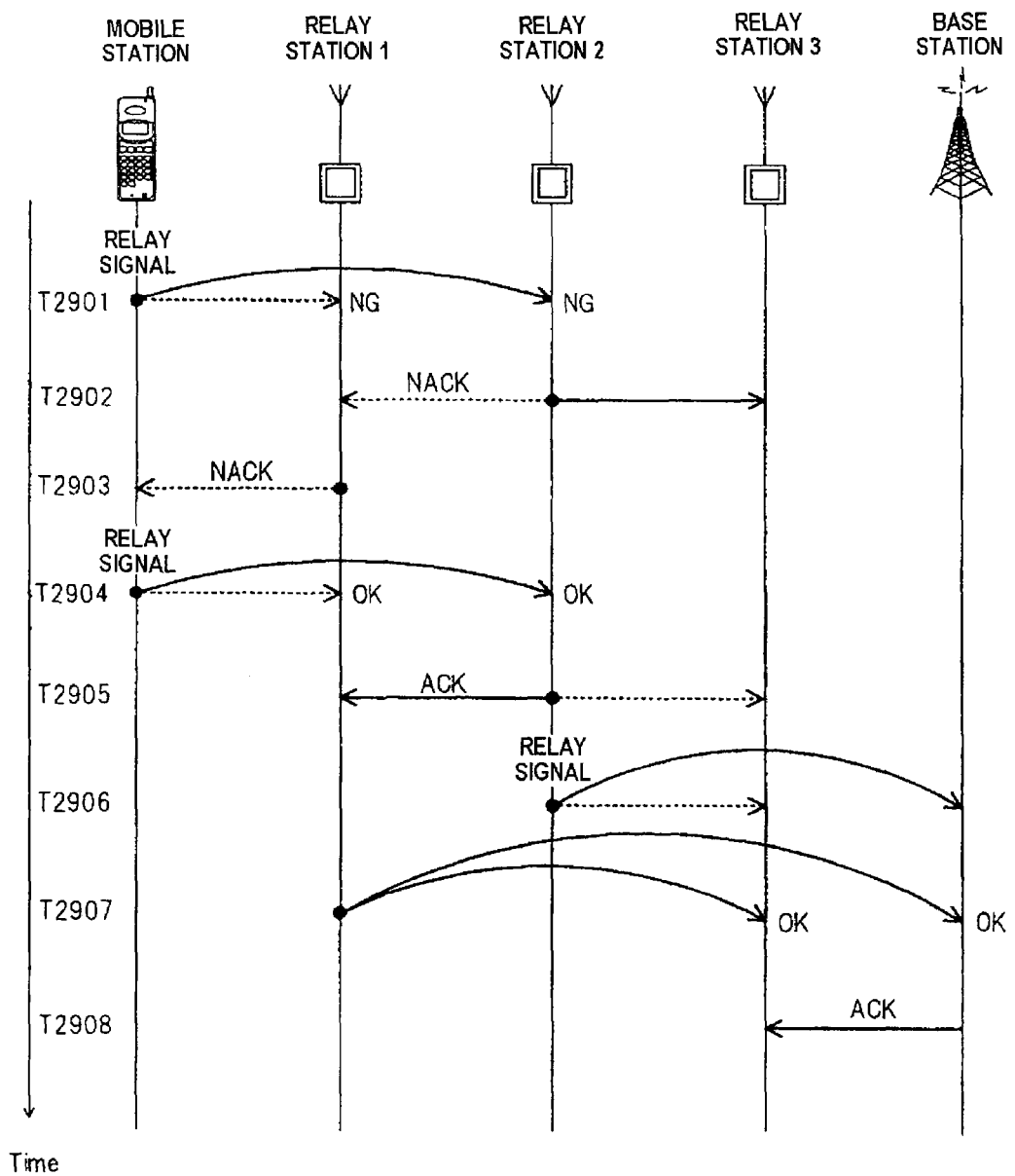
FIG. 29 illustrates an operation example (pattern 4) of the radio communication method according to the fifth embodiment of the invention.

FIG. 29 shows an operation example (pattern 4). The pattern 4 is a case in which, when the mobile station transmits a signal, both the relay station 1 and the relay station 2 fail in receiving the signal (T2901). Since the relay station 2 fails in receiving the signal, it transmits NACK to the relay station 1 that is one hop upstream therefrom (T2902). The relay station 1 transmits NACK to the mobile station since both the relay station 1 and the relay station 2 fail in receiving the signal (T2903).

When receiving NACK from the relay station 1, the mobile station retransmits the relay signal (T2904). In this case, the mobile station sets the MCS used by the mobile station to transmit signals to the relay station 2 and transmits the relay signal with the set MCS. After receiving NACK from the relay station 2 (T2902), the relay station 3 predicts the retransmission of the relay signal from the relay station 1. However, since the relay station 1 also fails in receiving the signal and the relay signal is not retransmitted from the relay station 1, the relay station 3 detects that no signal is transmitted from the relay station 1.

When succeeding in receiving the relay signal (T2904), the relay station 2 transmits ACK to the relay station 1 (T2905). The subsequent operation is the same as that in the pattern 1 (T2906 to T2908).

Figure 30:
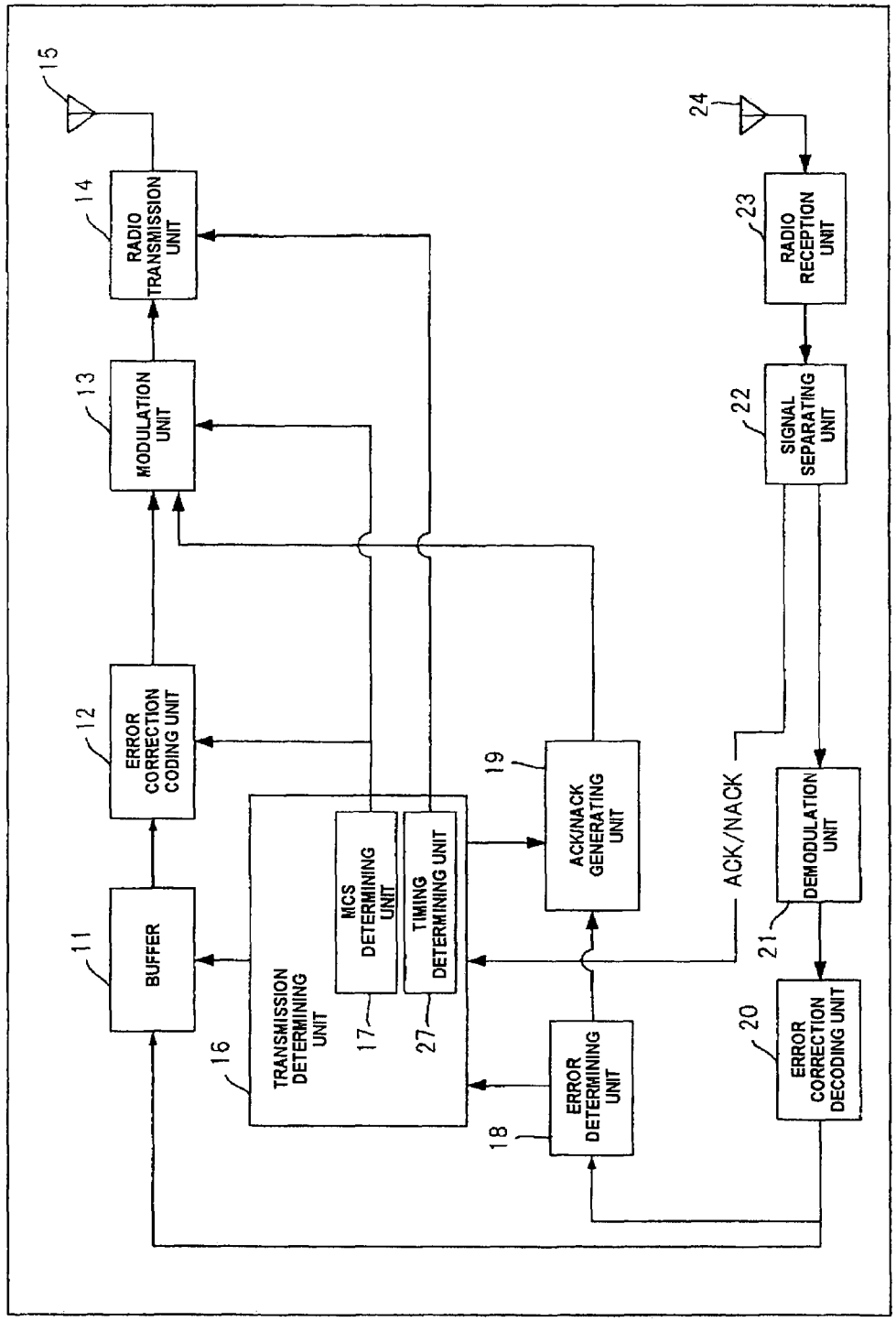
FIG. 30 is a block diagram illustrating the structure of a relay station device according to the fifth embodiment of the invention.

[Block diagram of relay station] FIG. 30 is a block diagram illustrating the structure of a relay station device according to this embodiment. The relay station device shown in FIG. 30 differs from the relay station device according to Embodiment 1 shown in FIG. 7 in that the transmission determining unit 16 further includes a timing determining unit 27 and in the operation of the transmission determining unit 16. Only the difference between this embodiment and Embodiment 1 will be described below.

The timing determining unit 27 instructs the radio transmission unit 14 so as to transmit the relay signal at a timing 1 (T1) when receiving the relay signal from the relay station that is two hops upstream therefrom and relay the relay signal at a timing 2 (T2) when receiving the relay signal from the relay station that is one hop upstream therefrom.

Figure 31:
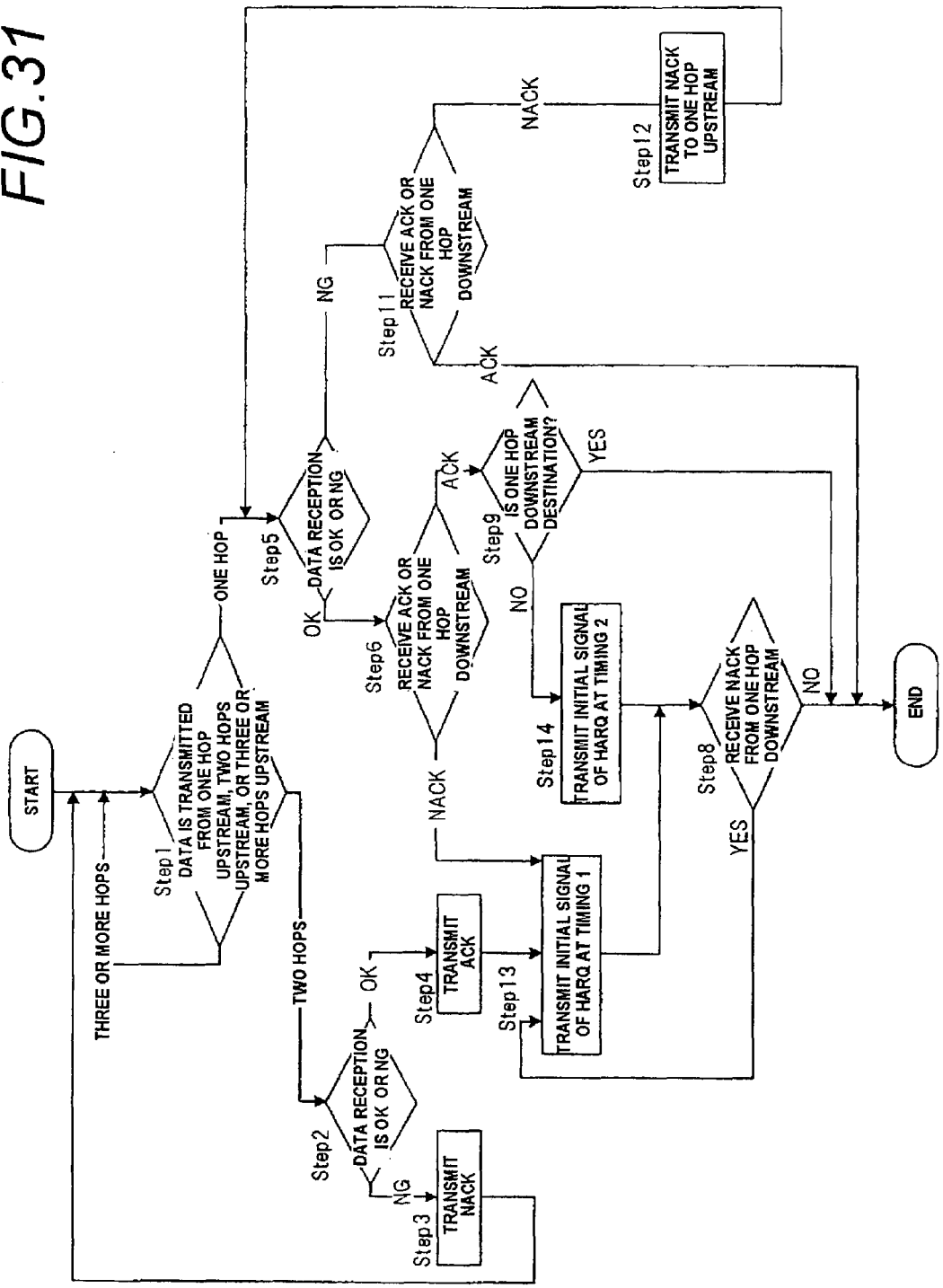
FIG. 31 is a flowchart illustrating the operation of a transmission determining unit according to the fifth embodiment of the invention.

FIG. 31 is a flowchart (Embodiment 5) illustrating the operation of the transmission determining unit 16 in the relay station device. A description of the same portions as those in the flowchart (FIG. 8) according to Embodiment 1 will be omitted.

In [Step 4], the transmission determining unit 16 determines to transmit ACK and then proceeds to Step 13. In [Step 6], the transmission determining unit 16 proceeds to Step 13 when receiving NACK from the relay station that is one hop downstream therefrom. In [Step 8], the transmission determining unit 16 proceeds to Step 13 when receiving NACK from the relay station that is one hop downstream therefrom. In [Step 9], the transmission determining unit 16 proceeds to Step 14 when the station that is one hop downstream is not the destination.

In [Step 13], the transmission determining unit 16 determines to transmit the initial signal of HARQ at the timing 1 on the basis of the determination result of the timing determining unit 27 and proceeds to Step 8. In [Step 14], the transmission determining unit 16 determines to transmit a retransmission signal of HARQ at the timing 2 on the basis of the determination result of the timing determining unit 27 and proceeds to Step 8.

As such, in this embodiment, each of the relay station 1 and the relay station 2 can set the relay signal to a modulation multi-value number suitable for relay. In addition, since the relay station 1 and the relay station 2 transmit signals including different parity bits, it is possible to improve the error correction effect of the receiver side.

The relay station 1 may receive the signal relayed by the relay station 2, instead of ACK from the relay station 2 and perform the determination operation. When succeeding in receiving the signal initially transmitted from the relay station 2, the relay station 3 may transmit the signal of the same MCS as that for the signal transmitted by the relay station 1 at the same timing. According to this structure, the diversity effect of the base station is improved.

In some cases, the relay station according to each of the above-described embodiments is also represented by a relay station, a repeater, a simple base station, and a cluster head.

Each functional block in each of the above-described embodiments is typically implemented by an LSI, which is an integrated circuit. Each of the functional blocks is manufactured as one chip or some or all of the functional blocks are incorporated into one chip. Here, each functional block is an LSI, but it is also called an IC, a system LSI, a super LSI, or an ultra LSI according to the degree of integration.

An integrated circuit manufacturing method is not limited to the LSI, but it may be implemented by a dedicated circuit or a general-purpose processor. After the LSI is manufactured, a programmable FPGA (Field Programmable Gate Array) or a reconfigurable process capable of reconfiguring the connection or setting of circuit cells in the LSI may be used.

When a circuit integration technique capable of substituting the LSI appears with the progress of a semiconductor technique or by other derivative techniques, the technique may be used to integrate the functional blocks. For example, biotechnology can be applied.

The invention has been described in detail with reference to specific embodiments, but it will be understood by those skilled in the art that various modifications and changes of the invention can be made without departing from the scope and spirit of the invention.

Priority is claimed on Japanese Patent Application No. 2008-133177, filed May 21, 2008, the content of which is incorporated herein by reference.

INDUSTRIAL APPLICABILITY

The radio communication device, the radio communication method, and the radio communication system according to the invention can be used as a radio communication device, a radio communication method, and a radio communication system capable of improving the usage efficiency of resources in multi-stage relay to reduce the amount of delay of the relay signal and improving the reception quality of signals by a relay station or a base station.

| Reference Signs List | |
|---|---|
| 1, 2, 3, 4: | RELAY STATION |
| 5: | MOBILE STATION |
| 6: | BASE STATION |
| 11, 31: | BUFFER |
| 12, 32: | ERROR CORRECTION CODING UNIT |
| 13, 33: | MODULATION UNIT |
| 14, 34: | RADIO TRANSMISSION UNIT |
| 15, 24, 35, 44: | ANTENNA |
| 16, 36: | TRANSMISSION DETERMINING UNIT |
| 17, 37: | MCS DETERMINING UNIT |
| 18, 38: | ERROR DETERMINING UNIT |
| 19, 39: | ACK/NACK GENERATING UNIT |
| 20, 40: | ERROR CORRECTION DECODING UNIT |
| 21, 41: | DEMODULATION UNIT |
| 22, 42: | SIGNAL SEPARATING UNIT |
| 23, 43: | RADIO RECEPTION UNIT |
| 25: | SNR DETERMINING UNIT |
| 26: | SNR SIGNAL GENERATING UNIT |
| 27: | TIMING DETERMINING UNIT |

The invention claimed is:

1. A relay radio communication device that relays between a source radio communication device and a destination radio communication device in multiple stages, comprising:
   a reception unit that receives a signal;
   an MCS (Modulation and Coding Scheme) setting unit that sets an MCS to be the same MCS used by a one-hop-downstream radio communication device for transmitting a relay signal, when succeeding in receiving a signal to be relayed from a one-hop-upstream radio communication device and receiving an ACK (acknowledge) from the one-hop-downstream radio communication device, wherein the ACK indicates an affirmative response to the signal to be relayed by the relay radio communication device and transmitted from the one-hop-upstream radio communication device;
   an encoding/modulation unit that encodes and modulates the signal to be relayed with the MCS set by the MCS setting unit; and
   a transmission unit that transmits the signal to be relayed as another relay signal encoded and modulated by the encoding/modulation unit.

2. The relay radio communication device according to claim 1, wherein
   the MCS setting unit sets the MCS to a value currently used by the relay radio communication device, for transmitting the another relay signal, when receiving a NACK (no acknowledge) from the one-hop-downstream radio communication device, wherein the NACK indicates a negative response to the signal to be relayed by the relay radio communication device and transmitted from the one-hop-stream radio communication device.

3. The relay radio communication device according to claim 1, wherein
   the MCS setting unit sets the MCS to be the same MCS used by the one-hop-downstream radio communication device for transmitting the relay signal, only when receiving control information for relaying the another relay signal to a two-hops-downstream radio communication device.

4. The relay radio communication device according to claim 1, wherein
   the MCS setting unit sets the MCS to be the same MCS used by the one-hop-downstream radio communication device for transmitting the relay signal, when receiving a NACK (no acknowledge) from a two-hops-downstream radio communication device.

5. The relay radio communication device according to claim 1, comprising:
   a transmission determining unit that determines whether to transmit the another relay signal, on the basis of whether there is an error in the received signal to be relayed and the ACK or a NACK (no acknowledge) received from the one-hop-downstream radio communication device, wherein
   the transmission determining unit determines not to transmit a further ACK/NACK corresponding to reception, by the relay radio communication device, of the signal to be relayed when receiving the signal to be relayed from the one-hop-upstream radio communication device, and determines to transmit the further ACK/NACK corresponding to reception, by the relay radio communication device, of the signal to be relayed when receiving the signal to be relayed from a two-hops-upstream radio communication device.

6. The relay radio communication device according to claim 1, comprising:
   a transmission determining unit that determines whether to transmit the another relay signal, on the basis of whether there is an error in the received signal to be relayed and the ACK or a NACK (no acknowledge) received from the one-hop-downstream radio communication device, wherein
   the transmission determining unit determines to transmit a further NACK to the one-hop-upstream radio communication device, when failing in receiving the signal to be relayed from the one-hop-upstream radio communication device and receiving the NACK from the one-hop-downstream radio communication device.

7. A radio communication device that relays between a source radio communication device and a destination radio communication device in multiple stages, comprising:
   a reception unit that receives a signal;
   an MCS (Modulation and Coding Scheme) setting unit that sets an MCS to be the same MCS used by a one-hop-upstream radio communication device for transmitting a relay signal, when succeeding in receiving a signal to be relayed from a two-hops-upstream radio communication device and receiving an ACK (acknowledge) from the one-hop-upstream radio communication device, wherein the ACK indicated an affirmative response to the signal to be relayed by the relay radio communication device and transmitted from the two-hops-upstream radio communication device;

an encoding/modulation unit that encodes and modulates the signal to be relayed with the MCS set by the MCS setting unit; and a transmission unit that transmits the signal to be relayed as another relay signal encoded and modulated by the encoding/modulation unit.

8. A radio communication system comprising:

a first radio communication device and a second radio communication device that relay between a source radio communication device and a destination radio communication device in multiple stages, wherein the source radio communication device transmits a relay signal to the second radio communication device, when the first radio communication device succeeds in receiving the relay signal transmitted from the source radio communication device to the second radio communication device, and in receiving an ACK (acknowledge) from the second radio communication device indicating an affirmative response to the relay signal, the first radio communication device transmits the relay signal to the destination radio communication device with a same MCS (Modulation and Coding Scheme) used by the second radio communication device to transmit the relay signal, thereby performing cooperative relay with the second radio communication device, when succeeding in receiving the relay signal transmitted from the source radio communication device, the second radio communication device transmits the ACK to the first radio communication device and transmits the relay signal to the destination radio communication device with said same MCS, thereby performing cooperative relay with the first radio communication device, and the destination radio communication device receives the relay signal that is cooperatively relayed by the first radio communication device and the second radio communication device with the same.

* * * * *